(12) United States Patent
Oami et al.

(10) Patent No.: US 11,403,771 B2
(45) Date of Patent: Aug. 2, 2022

(54) IMAGE PROCESSING APPARATUS, MONITORING SYSTEM, IMAGE PROCESSING METHOD, AND PROGRAM

(71) Applicant: NEC Corporation, Tokyo (JP)

(72) Inventors: Ryoma Oami, Tokyo (JP); Hiroyoshi Miyano, Tokyo (JP); Yusuke Takahashi, Tokyo (JP); Hiroo Ikeda, Tokyo (JP); Yukie Ebiyama, Tokyo (JP); Ryo Kawai, Tokyo (JP); Takuya Ogawa, Tokyo (JP); Kazuya Koyama, Tokyo (JP); Hiroshi Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/121,433

(22) Filed: Dec. 14, 2020

(65) Prior Publication Data

US 2021/0104053 A1 Apr. 8, 2021

Related U.S. Application Data

(63) Continuation of application No. 16/293,381, filed on Mar. 5, 2019, now Pat. No. 10,909,697, which is a
(Continued)

(30) Foreign Application Priority Data

Jun. 30, 2014 (JP) .................................. 2014-134786

(51) Int. Cl.
*G06T 7/292* (2017.01)
*H04N 7/18* (2006.01)
(Continued)

(52) U.S. Cl.
CPC ............ *G06T 7/292* (2017.01); *G06V 10/751* (2022.01); *G06V 20/53* (2022.01); *H04N 7/181* (2013.01);
(Continued)

(58) Field of Classification Search
CPC ...... G06T 7/292; G06V 10/751; G06V 20/53; H04N 7/181; H04N 7/188; G08B 13/19602
(Continued)

(56) References Cited

U.S. PATENT DOCUMENTS 5,275,184 A * 1/1994 Nishizawa ................ B08B 3/10
134/57 R
2002/0168084 A1 11/2002 Trajkovic et al.
(Continued)

FOREIGN PATENT DOCUMENTS

CN 101107637 A 1/2008
CN 101751553 A 6/2010
(Continued)

OTHER PUBLICATIONS

Office Action issued by the Chinese Patent Office in corresponding application No. CN 201580035751.X, dated Jun. 3, 2019.
(Continued)

*Primary Examiner* — Loi H Tran

(57) ABSTRACT

Provided is an image processing apparatus (2000) including an index value calculation unit (2020) and a presentation unit (2040). The index value calculation unit (2020) acquires a plurality of images captured by a camera (3000) (captured images), and calculates an index value indicating the degree of change in the state of a monitoring target in the captured image, using the acquired captured image. The presentation unit (2040) presents an indication based on the index value
(Continued)

calculated by the index value calculation unit (2020) on the captured image captured by the camera (3000).

15 Claims, 25 Drawing Sheets

Related U.S. Application Data continuation of application No. 15/323,294, filed as application No. PCT/JP2015/065725 on Jun. 1, 2015, now Pat. No. 10,269,126.

(51) Int. Cl.
  *G06V 10/75* (2022.01)
  *G06V 20/52* (2022.01)
  *G08B 13/196* (2006.01)

(52) U.S. Cl.
  CPC ....... H04N 7/188 (2013.01); *G08B 13/19602* (2013.01)

(58) Field of Classification Search
  USPC .......................................................... 348/143
  See application file for complete search history.

(56) References Cited

U.S. PATENT DOCUMENTS

| | | | |
|---|---|---|---|
| 2002/0180866 A1* | 12/2002 | Monroe | H04N 5/33 348/153 |
| 2005/0285939 A1* | 12/2005 | Kamijo | G06K 9/00711 348/149 |
| 2007/0039030 A1 | 2/2007 | Romanowich et al. | |
| 2007/0090951 A1 | 4/2007 | Chan et al. | |
| 2008/0312871 A1 | 12/2008 | Salcedo | |
| 2009/0222388 A1 | 9/2009 | Hua et al. | |
| 2010/0277333 A1 | 11/2010 | Van De Sluis et al. | |
| 2010/0322516 A1 | 12/2010 | Xu et al. | |
| 2011/0037850 A1 | 2/2011 | Tsou | |
| 2011/0181689 A1* | 7/2011 | Kweon | H04N 5/23293 348/37 |
| 2013/0113934 A1 | 5/2013 | Hotta et al. | |
| 2013/0162424 A1 | 6/2013 | Treacy | |
| 2013/0176430 A1 | 7/2013 | Zhu et al. | |
| 2013/0268230 A1 | 10/2013 | Deeks | |
| 2014/0161315 A1 | 6/2014 | Ostrovsky-Berman et al. | |
| 2015/0015704 A1 | 1/2015 | Hirasawa et al. | |
| 2015/0235379 A1 | 8/2015 | O'Gorman et al. | |
| 2016/0078286 A1 | 3/2016 | Tani et al. | |
| 2017/0210379 A1 | 7/2017 | Obata et al. | |

FOREIGN PATENT DOCUMENTS

| | | |
|---|---|---|
| CN | 103003844 A | 3/2013 |
| CN | 103177182 A | 6/2013 |
| CN | 103246869 A | 8/2013 |
| JP | H9-81874 A | 3/1997 |
| JP | 2003-259337 | 9/2003 |
| JP | 2005-328236 A | 11/2005 |
| JP | 2007-209008 | 8/2007 |
| JP | 2008-519567 | 6/2008 |
| JP | 2009-148498 | 7/2009 |
| JP | 2010-72782 | 4/2010 |
| JP | 2011-018094 A | 1/2011 |
| JP | 2011-040032 A | 2/2011 |
| JP | 2011-130203 | 6/2011 |
| JP | 2012-22370 | 2/2012 |
| JP | 2012-156571 A | 8/2012 |
| JP | 2014-54899 A | 3/2014 |

OTHER PUBLICATIONS

Office Action issued by the Japanese Patent Office in corresponding application No. JP 2016-531203, dated May 14, 2019.
Decision to Grant a Patent issued by the Japanese Patent Office in corresponding application No. JP 2016-531203, dated Sep. 3, 2019.
International Search Report and Written Opinion dated Sep. 1, 2015, in corresponding PCT International Application.
Office Action dated Oct. 28, 2019, by the United States Patent and Trademark Office in counterpart U.S. Appl. No. 16/293,359.
Office Action, dated Apr. 23. 2020, issued by the United States Patent Office in counterpart U.S. Appl. No. 16/293,359.
Decision to Grant a Patent dated Oct. 27, 2020, issued by the Japanese Patent Office in counterpart Japanese Patent Application No. JP 2019-182148.
Japanese Office Action for JP Application No. 2020-189231 dated Nov. 9, 2021 with English Translation.

* cited by examiner

FIG. 20

| TIME | PARTIAL REGION ID |
|---|---|
| t1 | PARTIAL REGION 1 |
| t2 | PARTIAL REGION 2 |
| t3 | PARTIAL REGION 4 |
| t4 | PARTIAL REGION 1 |

IMAGE PROCESSING APPARATUS, MONITORING SYSTEM, IMAGE PROCESSING METHOD, AND PROGRAM

CROSS-REFERENCE TO RELATED PATENT APPLICATIONS

This application is a continuation of U.S. patent application Ser. No. 16/293,381, filed Mar. 5, 2019, which is a continuation of U.S. patent application Ser. No. 15/323,294 (now U.S. patent Ser. No. 10/269,126), filed Dec. 30, 2016, which is a National Stage Entry of International Application No. PCT/JP2015/065725, filed Jun. 1, 2015, which claims priority from Japanese Patent Application No. 2014-134786, filed Jun. 30, 2014. The entire contents of the above-referenced applications are expressly incorporated herein by reference.

TECHNICAL FIELD

The present invention relates to an image processing technique.

BACKGROUND ART

A method of monitoring a facility or the like includes a method of performing monitoring by viewing images obtained from a monitoring camera that captures images of the facility or the like. A technique for facilitating monitoring using a monitoring camera has been developed.

Patent Document 1 discloses an abnormal behavior detection apparatus that detects abnormal behaviors. This apparatus divides the level of congestion into a plurality of stages and obtains a normal movement pattern on the basis of the level of congestion. The determination of whether being abnormal behavior is performed by determining whether or not a movement pattern of a target object matches the normal movement pattern based on the level of congestion at that time.

Patent Document 2 discloses a monitoring system having a function of presenting the state of a monitoring target on an image which is displayed on a monitor. Specifically, the degree of commonness of a moving direction of a crowd and a numerical value indicating the moving direction of the crowd are presented on an image obtained by capturing an image of the crowd.

RELATED DOCUMENT

Patent Document

[Patent Document 1] Japanese Unexamined Patent Application Publication No. 2010-072782
[Patent Document 2] Japanese Unexamined Patent Application Publication No. 2012-022370

SUMMARY OF THE INVENTION

In the techniques disclosed in the related art, it may be difficult to immediately ascertain the current condition of a monitoring target. For example, when an observer desires to ascertain whether a person captured by a monitoring camera is a person passing by the place or is a person prowling about the place, the observer needs to continue viewing an image captured by the monitoring camera for a certain period of time.

The invention is contrived in view of the above-mentioned problem, and an object thereof is to provide a technique with which a person monitoring a monitoring camera can immediately ascertain the current condition of a monitoring target.

There is provided an image processing apparatus including an index value calculation unit calculating an index value indicating a degree of change in a state of a monitoring target in a plurality of captured images using the captured images, the captured images being captured by a camera at different times; and a presentation unit presenting an indication based on the index value on a first captured image captured by the camera.

There is provided a monitoring system including a camera, an image processing apparatus, and a display screen.

The image processing apparatus is the above-described image processing apparatus of the invention. In addition, the display screen displays the first captured image on which an indication based on the index value is presented by the presentation unit.

There is provided an image processing method performed by a computer. The method includes calculating an index value indicating a degree of change in a state of a monitoring target in a plurality of captured images using the captured images, the captured images being captured by a camera at different times; and presenting an indication based on the index value on a first captured image captured by the camera.

There is provided a program that causes a computer to have a function of operating as the image processing apparatus of the invention by causing the computer to have functions of functional components included in the image processing apparatus of the invention.

According to the invention, provided is a technique with which a person monitoring a monitoring camera can immediately ascertain the current condition of a monitoring target.

BRIEF DESCRIPTION OF THE DRAWINGS

The objects described above, and other objects, features and advantages are further made more apparent by suitable embodiments that will be described below and the following accompanying drawings.

FIG. 20 is a diagram illustrating information in which a partial region corresponding to an observer's eye gaze direction and time at which the eye gaze direction of the observer has changed, in a table format.

DESCRIPTION OF EMBODIMENTS

Figure 1:
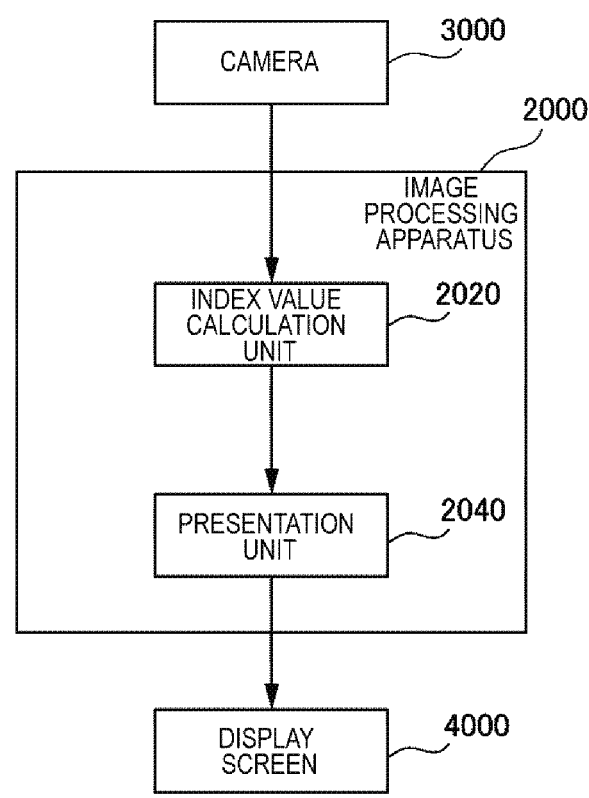
FIG. 1 is a block diagram illustrating an image processing apparatus according to a first exemplary embodiment.

Hereinafter, exemplary embodiments of the invention will be described with reference to the accompanying drawings. In all the drawings, like reference numerals denote like components, and descriptions thereof will not be repeated.

First Exemplary Embodiment

FIG. 1 is a block diagram illustrating an image processing apparatus 2000 according to a first exemplary embodiment. In FIG. 1, an arrow indicates a flow of information. Further, in FIG. 1, each block indicates a function-based configuration instead of a hardware-based configuration.

The image processing apparatus 2000 includes an index value calculation unit 2020 and a presentation unit 2040. The index value calculation unit 2020 acquires a plurality of images which are captured by a camera 3000 (hereinafter, captured images). In example of the camera 3000 is a monitoring camera. In addition, the plurality of captured images are captured at different times. For example, the plurality of captured images are frames constituting a movie which the camera 3000 captures.

Further, the index value calculation unit 2020 calculates an index value indicating the degree of change in the state of a monitoring target in an acquired captured image using the captured images.

The presentation unit 2040 presents an indication, which is based on the index value calculated by the index value calculation unit 2020, on the image that the camera 3000 captures. Here, the captured image may be an image used for the calculation of an index value, or may be an image not used for the calculation of an index value. In the former case, for example, the presentation unit 2040 presents an indication based on an index value calculated using first to n-th captured images on the n-th captured image. In addition, in the latter case, for example, the presentation unit 2040 presents an indication based on an index value calculated using the first to n-th captured images on an (n+1)-th captured image. Hereinafter, a captured image of a target on which the presentation unit 2040 presents an indication based on an index value is also written as a presentation target image.

Figure 2:
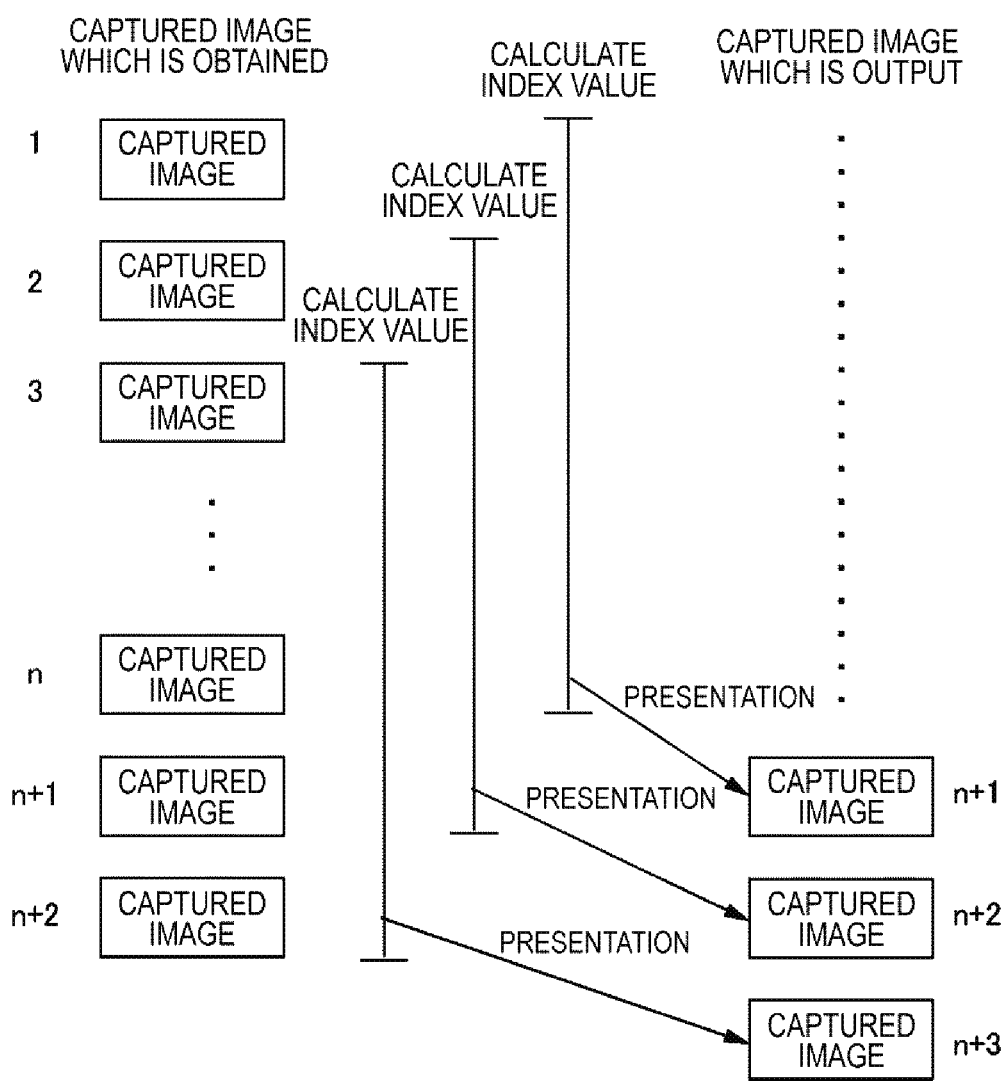
FIG. 2 is a diagram conceptually illustrating a process of calculating an index value of a monitoring target for each presentation target image.

For example, the presentation unit 2040 calculates an index value of a monitoring target for each presentation target image. FIG. 2 is a diagram conceptually illustrating a process of calculating an index value of a monitoring target for each presentation target image. In FIG. 2, the presentation unit 2040 presents an indication based on an index value calculated using the first to n-th captured images on an (n+1)-th captured image. Similarly, the presentation unit 2040 presents an indication based on an index value calculated using the second to (n+1)-th captured images on an (n+2)-th captured image, and presents an indication based on an index value calculated using the third to (n+2)-th captured images on an (n+3)-th captured image.

Figure 3:
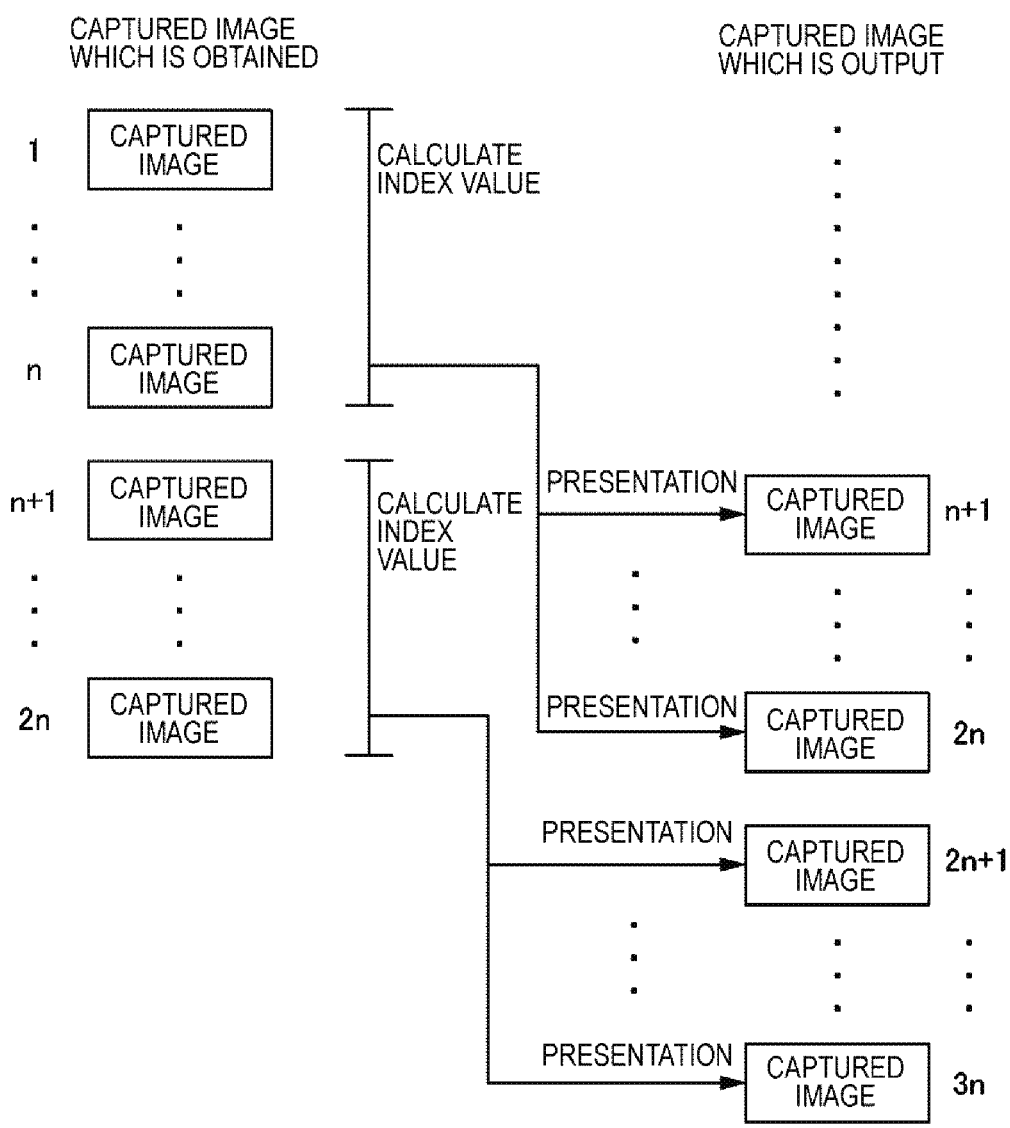
FIG. 3 is a diagram conceptually illustrating a process of presenting an indication which is common to a plurality of presentation target images.

In addition, for example, the presentation unit 2040 may use an index value calculated using a plurality of captured images in common for a plurality of presentation target images. FIG. 3 is a diagram conceptually illustrating a process of presenting an indication which is common to a plurality of presentation target images. In FIG. 3, the presentation unit 2040 presents an indication based on an index value calculated using first to n-th captured images on each of (n+1)-th to 2n-th captured images. Similarly, the presentation unit 2040 presents an indication based on an index value calculated using the (n+1)-th to 2n-th captured images on each of (2n+1)-th to 3n-th captured images.

<Example of Hardware Configuration>

Each functional component of the image processing apparatus 2000 may be implemented with a hardware constituent element (for example, an hard-wired electronic circuit or the like) which implements each functional component, or may be implemented by a combination of a hardware constituent element and a hardware constituent element (for example, combination of an electronic circuit and a program for controlling the electronic circuit, or the like).

Figure 4:
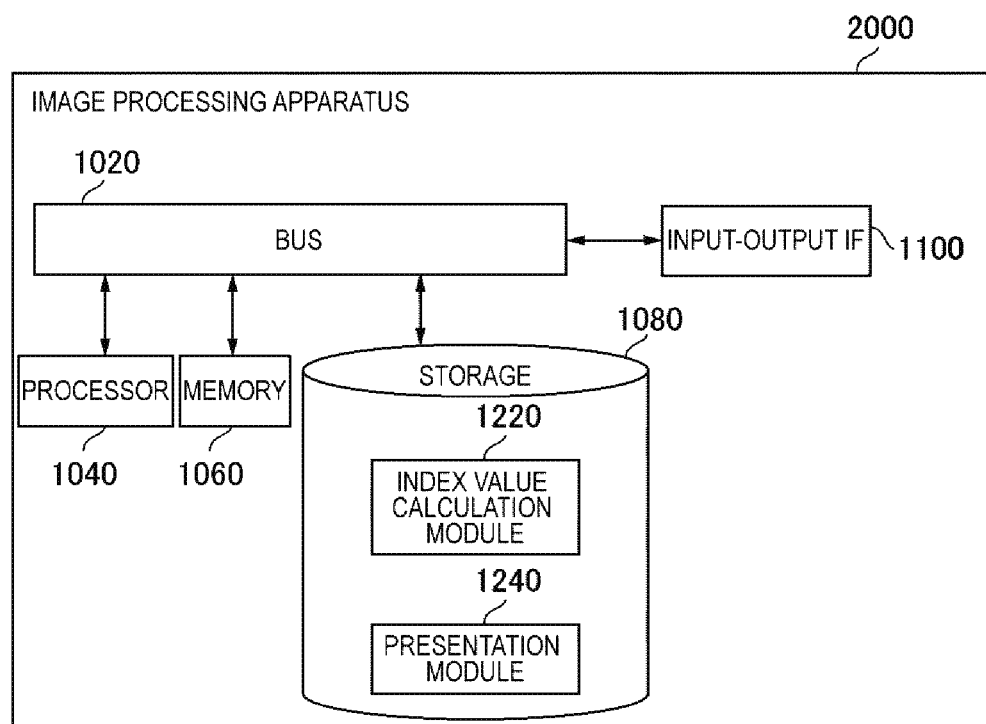
FIG. 4 is a block diagram illustrating a hardware configuration of the image processing apparatus.

FIG. 4 is a block diagram illustrating a hardware configuration of the image processing apparatus 2000. The image processing apparatus 2000 includes a bus 1020, a processor 1040, a memory 1060, a storage 1080, and an input-output interface 1100. The bus 1020 is a data transmission channel for allowing the processor 1040, the memory 1060, the storage 1030, and the input-output interface 1100 to transmit and receive data to and from each other. Here, a method of connecting the processor 1040 and the like to each other is not limited to bus connection. The processor 1040 is an arithmetic processing device such as, for example, a central processing unit (CPU) or a graphics processing unit (GPU) The memory 1060 is a memory such as, for example, a random access memory (RAM) or a read only memory (ROM) The storage 1080 is a storage device such as, for example, a hard disk, a solid state drive (SSD), or a memory card. In addition, the storage 1080 may be a memory such as a RAM or a ROM. The input-output interface 1100 is an input-output interface for allowing the image processing apparatus 2000 to transmit and receive data to and from an external apparatus and the like. For example, the image processing apparatus 2000 acquires a captured image through the input-output interface 1100. In addition, for example, the image processing apparatus 2000 outputs a captured image on which an indication based on an index value is presented, through the input-output interface 1100.

The storage 1080 includes an index value calculation module 1220 and a presentation module 1240 as a program for realizing the function of the image processing apparatus 2000. The processor 1040 realizes the functions of the index value calculation unit 2020 and the presentation unit 2040 by executing the modules. Here, when the above-mentioned modules are executed, the processor 1040 may execute the modules after reading the modules on the memory 1060 or may execute the modules without reading the modules on the memory 1060.

The hardware configuration of the image processing apparatus 2000 is not limited to the configuration illustrated in FIG. 4. For example, each module may be stored in the memory 1060. In this case, the image processing apparatus 2000 may not include the storage 1080.

<Flow of Processing>

Figure 5:
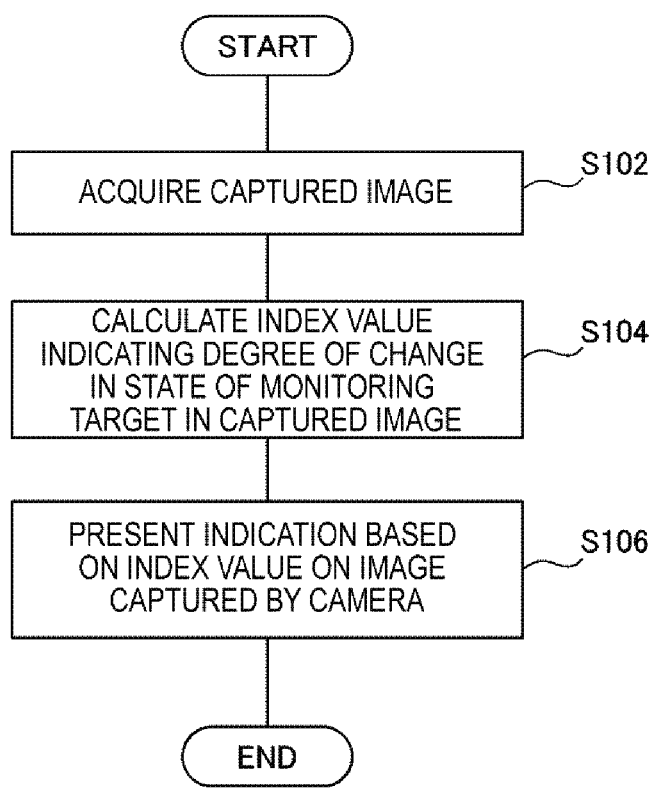
FIG. 5 is a flow chart illustrating a flow of processing performed by the image processing apparatus of the first exemplary embodiment.

FIG. 5 is a flow chart illustrating a flow of processing that the image processing apparatus 2000 of the first exemplary embodiment performs. In step S102, the index value calculation unit 2020 acquires a captured image. In step S104, the presentation unit 2040 calculates an index value indicating the degree of change in the state of a monitoring target in the captured image. In step S106, the presentation unit 2040 presents an indication based on an index value on an image (presentation target image) that the camera 3000 captures.

<Operational Advantages>

When an observer or the like wants to ascertain to what extent the state of a monitoring target captured by a monitoring camera has changed, the observer needs to continuously view the object of the monitoring camera. Even when the state of the monitoring target at that time can be ascertained only by viewing the image for a short period of time, for example, about one second, it is difficult to ascertain to what extent the state of the monitoring target has changed.

On the other hand, according to the image processing apparatus 2000 of the present exemplary embodiment, an indication indicating the degree of change in the state of a monitoring target is presented on a presentation target image. Suppose that an image captured by the camera 3000 is displayed on a display screen 4000. In this case, the display screen 4000 displays an image on which an indication based on an index value is overlapped. For this reason, an observer or the like can easily ascertain in a short period of time to what extent the state of a monitoring target has changed. Accordingly, the observer or the like can immediately and easily ascertain the current condition of the monitoring target.

Hereinafter, the present exemplary embodiment will be described in more detail.

<Method of Acquiring Captured Image>

A method for the index value calculation unit 2020 to acquire a captured image is arbitrary. For example, the index value calculation unit 2020 acquires a captured image from the camera 3000. In addition, the index value calculation unit 2020 may acquire a captured image stored in a storage device which is located outside the camera 3000. In this case, the camera 3000 is configured to store a captured image in the storage device. The storage device may be provided within the image processing apparatus 2000, or may be provided outside the image processing apparatus 2000.

In addition, a process of acquiring a captured image may be a process in which the index value calculation unit 2020 receives a captured image which the camera 3000 or the above-mentioned storage device outputs, or may be a process in which the index value calculation unit 2020 reads out a captured image from the camera 3000 or the above-mentioned storage device.

<Details of Monitoring Target>

There are various monitoring targets that the image processing apparatus 2000 handles. For example, the image processing apparatus 2000 handles an object (a person, a thing or the like) or a set of objects (crowd or the like) as monitoring targets. Note that, an object indicating a thing may include a place. In other words, the image processing apparatus 2000 may handles a place (region) in a captured image as a monitoring target.

For example, the index value calculation unit 2020 divides a region included in a captured image into a foreground region and a background region, and handles the foreground region as an object. Here, a method of extracting an object such as a person or a thing from an image is not limited to the above-described method. Techniques of extracting objects such as a person and a thing from an image are already known, and the index value calculation unit 2020 can use the known techniques. Here, the known techniques will not be described.

<Method of Determining Monitoring Target>

The image processing apparatus 2000 may set all objects extracted from a captured image as monitoring targets, or may set only specific objects as monitoring targets. For example, the image processing apparatus 2000 handles only a person or a set of people (crowd) as a monitoring target. In addition, the image processing apparatus 2000 may set only a specific person or crowd as a monitoring target. In this case, the image processing apparatus 2000 acquires information indicating a monitoring target for example, a blacklist), and determines the monitoring target on the basis of the information. The information indicating a monitoring target indicates, for example, a feature value of each monitoring target. In addition, the information indicating a monitoring target may be information indicating the features of a person to be monitored, such as "wearing a hat" or "wearing sunglasses". Here, since a technique of determining an object having a specific feature from the objects included in an image is a known technique, a detailed method will not be described.

<Details of Presentation Unit 2040>

As described above, the presentation unit 2040 presents an indication based on an index value, on an image captured by the camera 3000 (presentation target image). For example, a process of presenting an indication based on an index value on a presentation target image is a process of presenting an index value calculated for a monitoring target near the monitoring target in the presentation target image. Other examples of the "process of presenting an indication based on an index value on a presentation target image" will be described in exemplary embodiments later, and the like.

Here, the phrase "presenting an indication on a presentation target image" refers to, for example, a process of combining the indication into the presentation target image or overlapping the indication on the presentation target image. In this case, the presentation unit 2040 may output the presentation target image having the indication combined thereinto to an output device such as the display screen 4000 or the like, or may store the presentation target image in a storage device provided inside or outside the image processing apparatus 2000. In the latter case, the display screen 4000 or another device reads the presentation target image stored in the storage device and outputs the image to the display screen 4000. Note that, the display screen 4000 is, for example, a monitor installed in a workroom or the like of an observer, a monitor of a mobile phone of a security guard observing in the scene, or the like.

In addition, the presentation unit 2040 may separately generate image data indicating an indication based on an index value without combining the indication into a presentation target image. In this case, the indication is presented on the presentation target image by displaying the image data together with presentation target data.

In addition, the presentation unit 2040 may present an indication based on an index value on a map by using map data of a facility in which the camera 3000 is installed. The map data is displayed on the display screen 4000 or a monitor of a security guard's mobile phone or the like. The position of a monitoring target on the map can be calculated on the basis of various parameters of the camera 3000 (the position, the orientation or the like of the installed camera) and the position of the monitoring target on a captured image. In this case, the presentation unit 2040 acquires and uses map data of the facility in which the camera 3000 is installed and various parameters related to the camera 3000. Note that, a relationship between the various parameters of the camera 3000 and the position of the camera on the map is defined in advance by performing a process such as calibration.

Figure 6A:
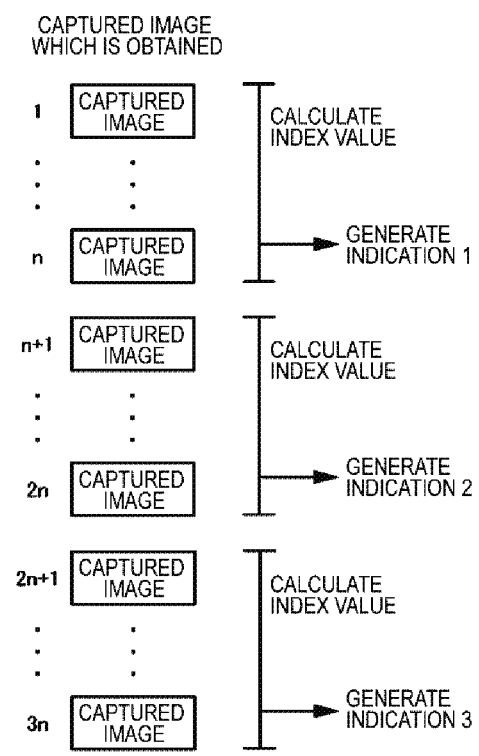
FIGS. 6A and 6B are diagrams conceptually illustrating a process of presenting an indication based on an index value in the format of an animation.
Figure 6B:
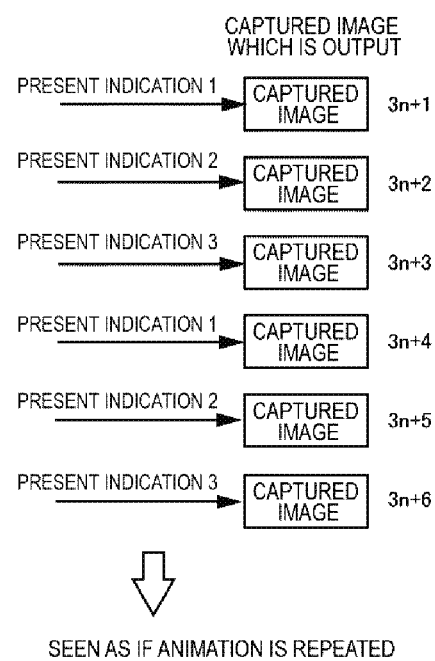

In addition, the presentation unit 2040 may present an indication based on an index value calculated for a monitoring target in the format of an animation (frame-by-frame playback) FIGS. 6A and 6B are diagram conceptually illustrating a process of presenting an indication based on an index value in the format of an animation. In FIG. 6A, the index value calculation unit 2020 calculates an index value indicating the degree of change in the states of monitoring targets in first to n-th captured images, and generates an indication 1 on the basis of the index value. Similarly, the index value calculation unit 2020 generates an indication 2 using (n+1)-th to 2n-th captured images, and generates an indication 3 using (2n+1)-th to 3n-th captured images.

FIG. 6B, the presentation unit 2040 presents the indication 1 on the 3n-th captured image, presents the indication 2 on a (3n+1)-th captured image, and presents the indication 3 on a (3n+2)-th captured image. By doing so, the indications 1 to 3 are presented in the format of an animation. Further, the presentation unit 2040 may also repeat displays such as "display 1, display 2, and display 3" for the subsequent captured images. In this manner, an animation constituted by the indication 1 to the indication 3 is repeatedly presented on a captured image.

<Method of Calculating Index Value>

As described above, the index value calculation unit 2020 calculates an index value indicating the degree of change in the state of a monitoring target in a captured image. Here, there are various "states of a monitoring target" which the image processing apparatus 2000 handles as monitoring targets, and the method of calculating an index value depends on what is handled as a monitoring target. Consequent hereinafter, a state of a monitoring target handled by the image processing apparatus 2000 and a method of calculating an index value indicating the degree of change in the state of the monitoring target will be described.

«Position of Monitoring Target»

For example, the index value calculation unit 2020 handles the position of a monitoring target as the state of the monitoring target. For example, when there is a person standing for a long period of time at a path where people pass through, it is considered that the person should be attentively monitored. Thus, the index value calculation unit 2020 handles the degree of change in the position of a monitoring target, as the degree of change in the state of the monitoring target. The degree of change in the position of the monitoring target can be described as the degree of staying of the monitoring target in another way. An observer or the like can immediately ascertain the degree of staying of each monitoring target by calculating an index value on the basis of the degree of staying of the monitoring target and presenting an indication based on the index value on a presentation target captured image.

For example, the degree of change in the position of a monitoring target is represented by the length of time for which a certain monitoring target (the same person, a crowd, or the like) is seen in a captured image. Here, the length of time for which the monitoring target in the captured image can be represented, for example, according to how many captured images show the monitoring target, among captured images which are captured in time series (frames constituting a movie).

In addition, for example, the index value calculation unit 2020 may represent the degree of change in the position of a monitoring target, by the size of a moving range of the monitoring target. For example, the size of the moving range of the monitoring target is represented by the size of a region (a circular shape, a rectangular shape, or the like) which includes all of the positions of monitoring targets in each captured image. Here, the size of the region is represented by the area of the region or the length of the side or the diameter of the region.

Further, the index value calculation unit 2020 may calculate the degree of change in the position of a monitoring target, also in consideration of the degree of spatial movement such as the movement of a portion of the body of the monitoring target.

«Frequency at which Monitoring Target is Captured in Captured Images»

In addition, for example, the index value calculation unit 2020 handles the frequency at which a certain monitoring target is seen in a captured image, as a state of the monitoring target. In other words, the index value calculation unit 2020 handles the degree of change in the frequency at which a certain monitoring target is seen in a captured image (the length of time for which the object being seen in the captured image) as the degree of change in the state of the monitoring target. Suppose that a certain monitoring target is not detected in a captured image over the first thirty minutes, is detected once in the captured image over the next thirty minutes, and is detected five times in the captured image over another subsequent period of thirty minutes. In this case, the frequency at which the monitoring target in the captured image is increasing. For this reason, the degree of change in the state of the monitoring target is high.

For example, in this case, since the frequency at which the monitoring target in the place gradually increased, it is also considered that the object is behaving unnaturally. For example, it is possible that habitual prowling or previewing of the scene before committing a crime may be performed. For this reason, it is preferable that an observer or the like performing monitoring by viewing a captured image attentively monitors such a monitoring target. Thus, the image processing apparatus 2000 calculates an index value on the basis of the degree of change in the frequency at which a monitoring target in a captured image, and presents an indication based on the index value on a presentation target image. Thereby, an observer or the like viewing the presentation target image can immediately ascertain the degree of change in the frequency at which each monitoring target is shown in a captured image.

For example, the index value calculation unit 2020 counts the number of times that each monitoring target is detected in a captured image for each predetermined period of time. The index value calculation unit calculates the degree of change in the frequency at which the monitoring target is detected in the captured image using the number of detections of the monitoring target, which number is calculated for each predetermined period of time. Alternatively, a time interval between the detections may be obtained, and the degree of change in the length of the time interval between the detections may be calculated.

«Degree of Crowdedness of Monitoring Target»

For example, the index value calculation unit 2020 handles the degree of crowdedness of a monitoring target as the state of the monitoring target. For example, when people are handled as monitoring targets, the degree of crowdedness of the monitoring targets is how much the people crowds, and is also described as the degree of congestion in another way. For example, when a narrow path is overcrowded with people, there is a risk of a crowd surge. In this case, since an action, such as an appropriate guidance by security guard's, is required, it is preferable that an observer viewing an image provided by a monitoring camera can immediately ascertain such a situation. The image processing apparatus 2000 presents an indication based on the degree of change in the degree of crowdedness of monitoring targets, on a presentation target image. Thus, the observer viewing the presentation target image can immediately recognize monitoring targets the congestion of which is still not eliminated even after the elapse of time.

The degree of crowdedness of monitoring target can be represented using, for example, the size of the monitoring target and the number of objects included in the monitoring target. Here, the size of the monitoring target is represented by the size of a region indicating the monitoring target. A method of representing the size of the region is as described above. For example, the index value calculation unit 2020 calculates the degree of crowdedness of a monitoring target using Expression (1). In Expression (1), "d" denotes the degree of crowdedness, "n" denotes the number of objects included in the monitoring target, and "a" denotes an area of a region indicating the monitoring target.

[Expression 1]

$$d = \frac{n}{a} \qquad (1)$$

Here, n may be the number of objects calculated by individually numerating the objects, or may be the number of objects estimated by collectively recognizing a group of the plurality of objects.

For example, the index value calculation unit 2020 calculates the degree of change in the degree of crowdedness by calculating the above-mentioned degree of crowdedness for each predetermined period of time.

«Length or Speed of Queue of Monitoring Target»

For example, the index value calculation unit 2020 handles the length of a queue of a monitoring target or the speed of proceeding thereof as the state of the monitoring target. Suppose that, in a store having a plurality of register counters, there is a queue of a register counter the length of which does not change for a long period of time (the speed of proceeding of a queue is low) among queues of each register counter In this case, it is considered that a certain trouble occurs at that register counter.

Thus, the index value calculation unit 2020 calculates an index value on the basis of the degree of change in the length of the queue of the monitoring target or the speed of proceeding thereof. The length of the queue of the monitoring target may be represented by the size of a region indicating the queue, or may be represented by the number of objects included in the queue of the monitoring target. Here, suppose that the length of the side or diameter of the region represents "the size of the region indicating the queue". In this case, for example, the index value calculation unit 2020 calculates the direction of the queue based on a direction in which the length of the queue changes, the orientations of objects included in the queue, and the like, and the "length of the region indicating the queue" is represented using the length of the side or diameter in the direction in the region indicating the queue.

Note that, the direction of the queue may be given in advance in association with the camera 3000. For example, when the orientation of the camera 3000 is fixed and the positions of the register counter and the like are also fixed, it is possible to determine the orientation of the queue in advance.

In addition, the index value calculation unit 2020 calculates the speed of proceeding of the queue from the degree of change in the length of the queue. Alternatively, it is also possible to calculate the speed of the queue by focusing on a specific object in the queue.

«Degree of Being Left Behind»

For example, the index value calculation unit 2020 sets a person, a baggage, or the like in an image obtained by capturing a platform of a station or the like as monitoring targets. The index value calculation unit 2020 calculates the degree of change in the number of people, pieces of baggage, or the like or the degree of change in the length of a queue of people or pieces of baggage (how much the people or the pieces of baggage are left be as the degree of change in the state of the monitoring target.

Figure 7A:
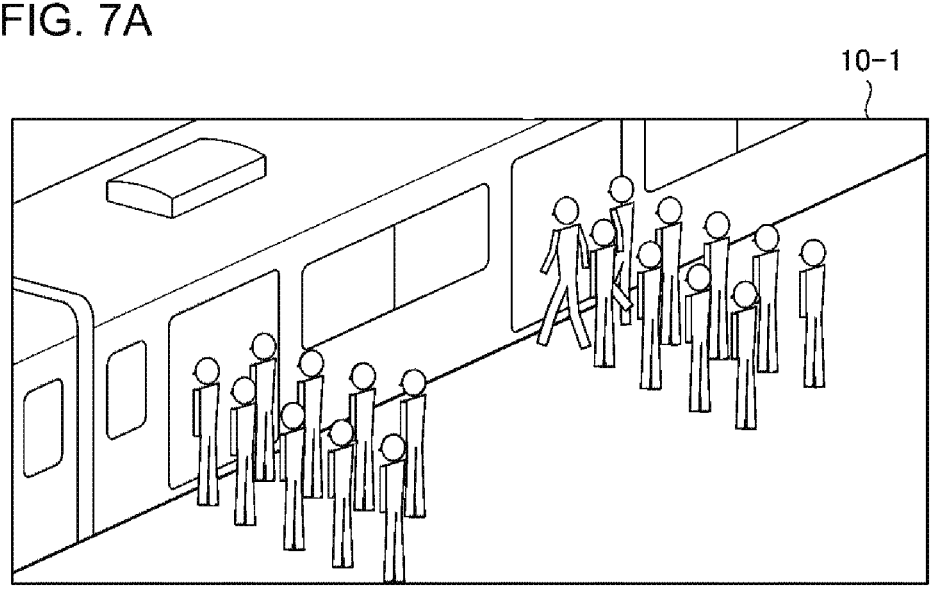
FIGS. 7A and 7B are diagrams illustrating a state where people are left behind.
Figure 7B:
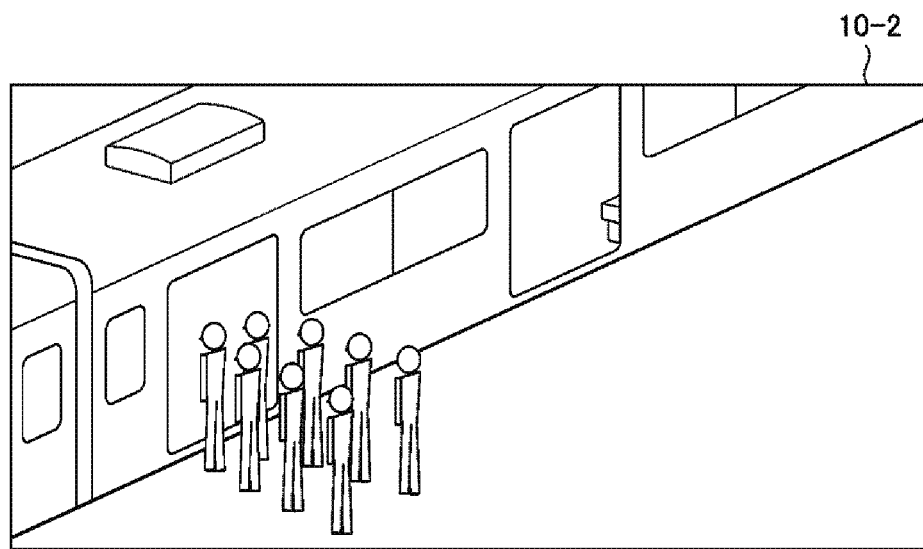

FIGS. 1A and 1B are diagrams illustrating a state where people are left behind. FIG. 1A illustrates a captured image 10-1 obtained by capturing a state immediately after a door of a train opens, and FIG. 7B illustrates a captured image 10-2 obtained by capturing a state immediately before a door of a train closes. Comparing the two captured images with each other, many people do not get on the train and are left in front of the door on the front side, whereas there is no one left behind at the door on the back side. When the degree of being left behind varies greatly depending on a boarding position as described above, it is considered that there are any troubles at the platform or within the train. The presentation unit 2040 presents an indication based on the degree of being left behind on a presentation target image, and thus an observer viewing the presentation target image can immediately ascertain how much people, pieces of baggage, or the like are left behind.

«The degree of Dissatisfaction of Monitoring Target»

The index value calculation unit 2020 may determine not only the state of a monitoring target (e.g. the above-mentioned position of the monitoring target) which is directly obtained by analyzing a captured image, but also the state of a monitoring target on the basis of an index obtained by applying the state to a model or the like.

For example, the index value calculation unit 2020 handles the degree of dissatisfaction of a monitoring target as a state of the monitoring target Here, suppose that the monitoring target is a crowd. The index value calculation unit 2020 calculates the degree of dissatisfaction of the crowd from the degree of congestion and information about the flow of the crowd. For example, it may be considered that a crowd having a high degree of congestion or a slow flow generally tends to become increasingly dissatisfied.

Thus, the degree of dissatisfaction of the crowd is modeled on the basis of a function of $F(u, v)$ using the degree of congestion "u" and a speed "v". Here, for example, $F(u, v)$ is of a monotone non-decreasing function of "u" and a monotone non-increasing function of "v". When the influences from "u" and "v" are independent on each other, it is described as $F(u, v)=f(u)g(v)$ with $f(u)$ being set as a monotone non-decreasing function of "u" and $g(v)$ being set as a monotone non-increasing function of "v".

Note that, the degree of dissatisfaction increases when the speed of the crowd is low, and the degree of dissatisfaction could also increase even when the speed of the crowd is too high. This is because people in the crowd feel the stress due to a difficulty in following the flow of the crowd. Thus, $g(v)$ may be modeled by a function which increases when "v" increases to a certain extent.

In addition, in a case of being lined up in queues, people would become more dissatisfied if the queue in which they are does not proceed while other queues proceed. Thus, the speeds of the proceeding of the respective queues are compared with each other. When the speed of proceeding of a certain queue is lower than the speeds of proceeding of the other queues, the degree of dissatisfaction may be increased so that it is equal to or higher than the degree of dissatisfaction determined with the value of "v". In other words, when $\Delta v$ is set as a difference in the speed between its own line and the neighboring line (the value obtained by subtracting the speed of its own line from the speed of the neighboring line), the modeling may be performed using $g2(v, \Delta v)$ which is a monotone non-decreasing function with respect to $\Delta v$ instead of $g(v)$. Here, it is assumed that $\Delta v$ has a positive value when the speed of its own queue is relatively low. And, it is assumed that the relation of $g2(v, 0)=g(v)$ is satisfied.

This method can also be applied to objects other than a crowd constituting a queue. Suppose that a flow of a certain crowd becomes slower than surrounding flows due to the presence of an obstacle or a people having walking handicap. In this case, the crowd may be modeled so that the degree of dissatisfaction increases. That is, when a gradient of "v" set to $\nabla v$, the influence of the speed of the flow may be modeled by $g2(v, \nabla v)$. In addition, the degree of dissatisfaction may be calculated on the basis of the positions of people belonging to the same crowd in a line (how much the people are far from the front) and an estimated time until the people reach the front of the line. This is because it is considered that a person closer to the front would finish an action of being in a line earlier, and Thus would be more patient with dissatisfaction.

Note that, the functions may vary due to other external factors. Other external factors include temperature, humidity, weather, brightness, and the like. For example, when the temperature is too high or two low as compared to a case of an appropriate temperature, it may be considered that the degree of dissatisfaction tends to increase. Thus, a model may be used in which the degree of dissatisfaction decreases under an appropriate temperature and increases under the temperature being outside the appropriate temperature.

Similarly, it is considered that the degree of dissatisfaction tends to increase in a case of rain as compared to a case of fine weather. Thus, a model may be used in which the degree of dissatisfaction tends to increase in a case of rain as compared to a case of fine weather. In addition, when a facility for which monitoring is performed using the camera 3000 is a stadium in which a game is played or the like, the winning and losing of the game and the like may be external factors. For example, when a person in a crowd is a supporter of a team that has lost or almost loses the game, modeling is performed so that the degree of dissatisfaction further increases.

《Degree of Risk of Monitoring Target》

For example, the index value calculation unit 2020 calculates how severe damage may occur when any event occurs near a monitoring target (for example, when a suspicious substance explodes or when a person with a weapon appears), that is, the degree of risk near the monitoring target, as the degree of risk of the monitoring target.

Specifically, since there would be many victims when an event occurs in a place very crowded with people, the degree of risk is high. In addition, even when the place is not crowded with people, the degree of risk is high in a place where a crowd gets panic and has difficulty in running away due to a characteristic of the structure of a building when an accident occurs. Specifically, it may be the place having a high degree of risk where the number of exits is small or the width of an exit is small with respect to the number of people capable of being accommodated in the place, or the exit is far therefrom.

Such a degree of risk is determined by the structural characteristics of the building and the state of the crowd. And, it is possible to generate a model for calculating the degree of risk by performing a simulation for the behavior of the crowd in advance with respect to various states of crowds. The index value calculation unit 2020 applies a feature value of the state of a crowd (density or flow) in a certain place actually shown in a captured image to the above-mentioned model, and thereby calculating the degree of risk in the place. Note that, it is able to determine a place where a crowd exists with the camera 3000 that captures the captured image showing the crowd. For example, when the sight of the camera 3000 is fixed or changes in a narrow range, it is able to specify a place where a monitoring target shown in a certain captured image exists by using an ID and the like of the camera 3000 having captured the captured image. In addition, when the camera 3000 monitors a wide range while changing its orientation, it is able to specify a position of a monitoring target shown in a certain captured image exists, for example, by using an ID and the like of the camera 3000 and the orientation of the camera 3000 at the time of image capturing.

Note that, the index value calculation unit 2020 may calculate the degree of risk in consideration of characteristics of a crowd to be monitored. For example, the index value calculation unit 2020 uses a model of calculating a high degree of risk for a crowd requiring time for movement (for example, a crowd including a group of the elderly people, a crowd of the people having walking handicap, or the like). Further, the index value calculation unit 2020 may use a model of calculating the degree of risk in consideration of external factors such as the weather. Specifically, the index value calculation unit 2020 uses a model in which the degree of risk becomes high when ambient light is weak due to a bad weather or when the ground surface is wet due to rain. In addition, when it is possible to acquire attributes of a crowd such as the elderly people, children, or people having walking handicap, the degree of risk may be calculated also in consideration of information of the attributes.

«Degree of Monitoring»

The image processing apparatus 2000 may set the degree of that a monitoring target is not monitored (hereinafter, the degree of insufficient monitoring) as a state of the monitoring target. Here, suppose that a security guard in the scene performs monitoring in a facility where the camera 3000 is installed. The security guard in the scene may be required to take charge of a wide range by oneself, or may be required to cope with a visitor during monitoring. For this reason, the degree of that the monitoring target is monitored by the security guard may vary.

Thus, the index value calculation unit 2020 handles the degree of insufficient monitoring of a monitoring target as a state of the monitoring target. For example, the degree of insufficient monitoring can be calculated on the basis of a distance between the monitoring target and a security guard near the monitoring target. Specifically, a configuration is provided in which the degree of insufficient monitoring becomes higher as the distance between the monitoring target and the security guard increases.

As a specific example, the degree of insufficient monitoring can be modeled by a monotone non-decreasing function $f(d)$, which increases as a distance d from a security guard increases. At this time, the degree of insufficient monitoring may also be modeled in consideration of the orientation of the security guard. Specifically, the degree of insufficient monitoring is modeled by a function $f(d, \theta)$ which is determined by the above-mentioned distance d and an absolute value $\theta$ of an angle of a gap between the orientation of the security guard and the direction to the location of the monitoring target (angle between a vector indicating a direction from the position of the security guard to the monitoring target and a vector indicating the orientation of the security guard). Here, $f(d, \theta)$ is set as a monotone non-decreasing function for $\theta$. When modeling is performed with the assumption that the influence of a distance and the influence of a direction are independent of each other, $g(d)$ and $n(\theta)$ are set as a monotone non-decreasing function for the distance d and a monotone non-decreasing function for the absolute value $\theta$ of the gap of the angle, respectively, and modeling can be performed like $f(d, \theta)=g(d) h(\theta)$.

In addition, the degree of that a security guard is focused on guarding (hereinafter, the degree of focusing on guarding) may be used for the calculation of the degree of insufficient monitoring. For example, the degree of focusing on guarding is determined by the state, posture, and the like of the security guard. For example, when a security guard, who should perform guarding with looking around the surrounding, faces downward or upward, it may be considered that the degree of focusing on guarding of the security guard is low. In addition, when the security guard performs an operation other than guarding even when the posture of the security guard faces the front, it may be considered that the degree of focusing on guarding of the security guard is low. The operation other than guarding includes, for example, an operation of dealing with a customer, an operation of contacting by a mobile phone, and an operation of installing a pole.

Here, there are various methods for the index value calculation unit 2020 to ascertain the state and posture of a security guard. For example, the index value calculation unit 2020 analyzes the state and posture of a security guard in a captured image. In addition, for example, the index value calculation unit 2020 may ascertain the posture of the security guard by acquiring posture information of a mobile phone from the mobile phone the security guard has. For example, the posture information of the mobile phone is information regarding acceleration for each of three-dimensional directions measured by an acceleration sensor included in the mobile phone.

The index value calculation unit 2020 calculates the degree of focusing on guarding which indicates, for example, a value of equal to or greater than 0 and equal to or less than 1, in accordance with the state and the like of the above-mentioned security guard. The index value calculation unit 2020 calculates the degree of insufficient monitoring using a model such as $f(d, \theta)$ mentioned above, and calculates the eventual degree of insufficient monitoring by multiplying the degree of focusing on guarding of the security guard by the calculated value.

Further, the index value calculation unit 2020 may calculate the degree of insufficient monitoring in consideration of the above-described degree of risk. Specifically, it may be considered that a monitoring target is a target to be monitored as the degree of risk is higher. Accordingly, even if the degrees of insufficient monitoring calculated using the above-described method are the same as each other, a monitoring target having a higher degree of risk is made to have a higher degree of insufficient monitoring which is eventually calculated. For example, the index value calculation unit 2020 calculates the degree of risk and the degree of insufficient monitoring with respect to a certain monitoring target using the above-described method, and sets a value obtained by multiplying the degrees together as the degree of insufficient monitoring which is eventually calculated.

Note that, when there are a plurality of security guards, the index value calculation unit 2020 may calculate the degree of insufficient monitoring for a certain monitoring target using the degrees of insufficient monitoring calculated for each of the security guards. For example, the index value calculation unit 2020 calculates the degree of insufficient monitoring for a certain monitoring target as statistical value (a minimum value, a maximum value, a mean value, or the like) of the degrees of insufficient monitoring for the monitoring target calculated for each of the security guards.

Here, the index value calculation unit 2020 may set the above-described degree of focusing on guarding as the value of the degree of insufficient monitoring.

Second Exemplary Embodiment

Figure 8:
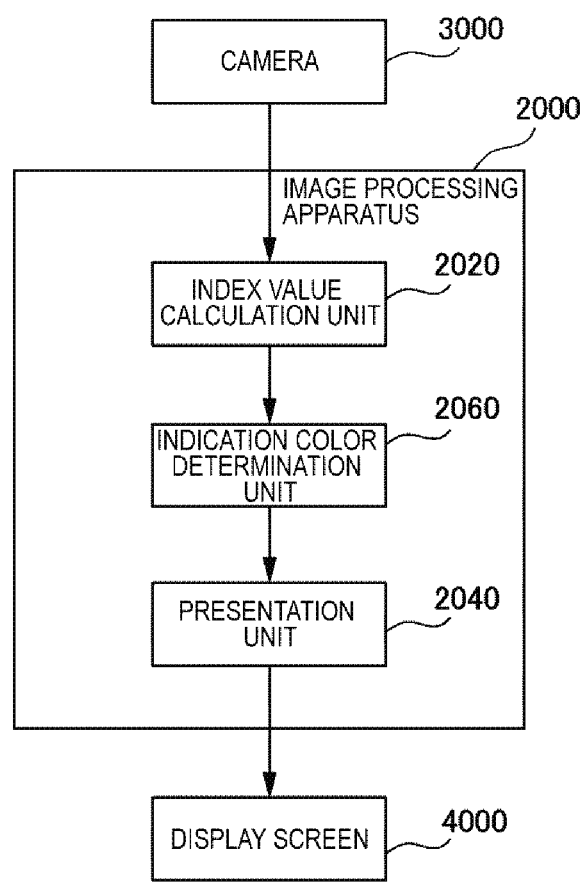
FIG. 8 is a block diagram illustrating an image processing apparatus according to a second exemplary embodiment.

FIG. 8 is a block diagram illustrating an image processing apparatus 2000 according to a second exemplary embodiment. In FIG. 8, an arrow indicates a flow of information. Further, in FIG. 8, each block indicates a function-based configuration instead of a hardware-based configuration.

The image processing apparatus 2000 according to the second exemplary embodiment includes an indication color determination unit 2060. The indication color determination unit 2060 according to the second exemplary embodiment determines an indication color for a monitoring target on the basis of an index value calculated for the monitoring target. A presentation unit 2040 changes the color of a monitoring target and the color around the monitoring target in a presentation target image to the indication color determined for the monitoring target.

For example, the indication color determination unit 2060 changes the density of the color of a monitoring target in accordance with the largeness of the index value of the monitoring target, and thereby determining an indication color of the monitoring target. For example, the indication color determination unit 2060 increases the density of the color of the monitoring target, as the index value is larger. In another way, the indication color determination unit 2060 may increase the density of the color of the monitoring target, as the index value is smaller.

Figure 9:
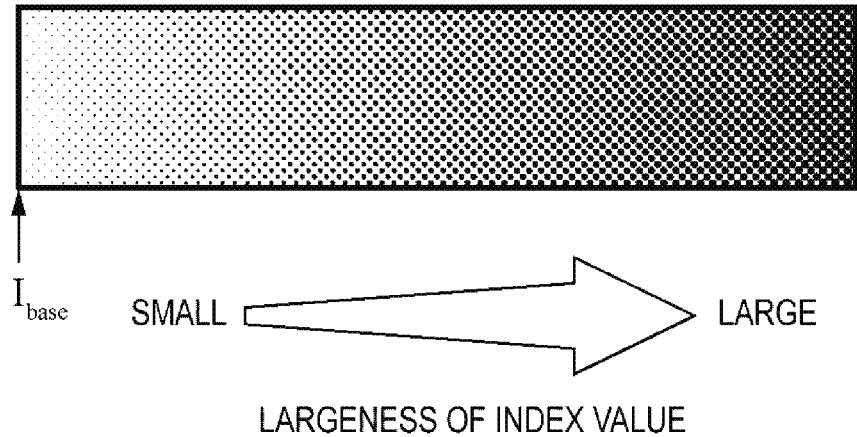
FIG. 9 is a diagram illustrating a color map in which a black becomes darker on the basis of an index value.

Furthermore, for example, the indication color determination unit 2060 expresses a monitoring target by one color and determines the density of the color on the basis of the largeness of the index value, and thereby determining an indication color of the monitoring target. For example, the indication color determination unit 2060 sets the indication color of the monitoring target as a black having a density based on the index value of the monitoring target. FIG. 9 is a diagram illustrating a color map in which a black becomes darker on the basis of the largeness of an index value. In the color map of FIG. 9, represented black is darker as dots become larger (moving to rightwards). In addition, the indication color determination unit 2060 may express an indication color of a monitoring target using any one of RGB colors and may determine the density of the color in accordance with the largeness of an index value. For example, the indication color determination unit 2060 sets the indication color of the monitoring target as red, and makes the red darker as the index value of the monitoring target becomes larger.

Figure 10:
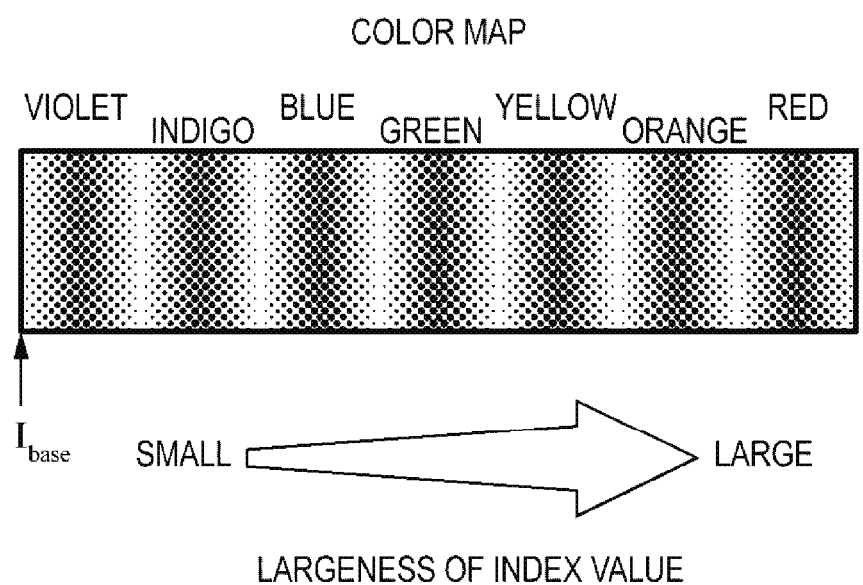
FIG. 10 is a diagram illustrating a rainbow-colored color map.

Besides, for example, the indication color determination unit 2060 uses a specific color map and determines color corresponding to the index value of the monitoring target with the color map, and sets the color as an indication color of the monitoring target. An example of a color map used includes a rainbow-colored color map, which is used for a heat map or the like. A representative rainbow-colored color map is constituted by gradation of red, orange, yellow, green, blue, indigo, and violet, as illustrated in FIG. 10. In FIG. 10, red, orange, yellow, green, blue, indigo, and violet are set in descending order of an index value. However, the color map used by the indication color determination unit 2060 is not limited to the color map illustrated in FIG. 10. The indication color determination unit 2060 can use any color map. Note that, the color map used by the indication color determination unit 2060 is stored in a storage unit provided inside or outside the image processing apparatus 2000.

Note that, the presentation unit 2040 may change only a portion of the color of a monitoring target instead of the entire color of the monitoring target. For example, when a monitoring target is a person, the presentation unit 2040 changes only the color of the face of the monitoring target.

SPECIFIC EXAMPLE

Figure 11A:
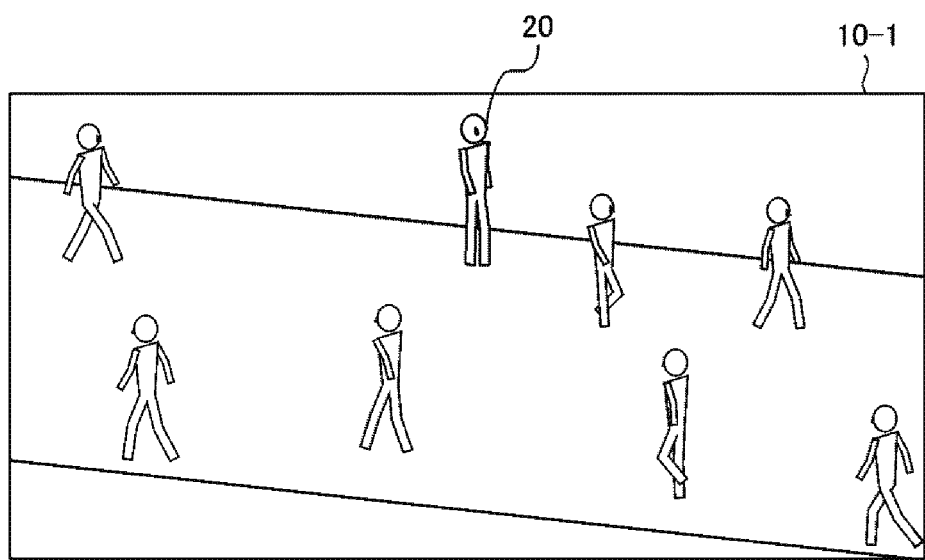
FIGS. 11A and 11B are diagrams conceptually illustrating that colors of a monitoring target and its surroundings are changed into those corresponding to an index value indicating the degree of change in the position of the monitoring target.
Figure 11B:
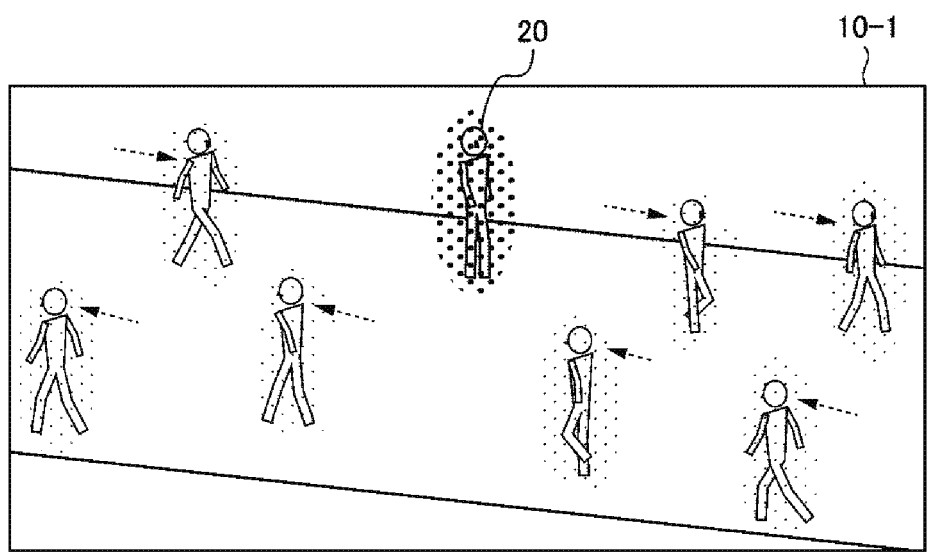

FIGS. 11A and 11E are diagrams conceptually illustrating that a color of a monitoring target and a color around the monitoring target are changed to a color based on an index value indicating the degree of change in the position of the monitoring target. Captured images 10-1 and 10-2 illustrated in FIGS. 11A and 11B are images obtained by capturing the same path at different times. The captured image 10-1 illustrated in FIG. 11A is an image captured prior to the captured image 10-2 illustrated in FIG. 11B. Comparing the captured images 10-1 and 10-2 with each other, the position of a person 20 does not change significantly, and the positions of the other people are significantly changing. Here, it is considered that the staying person is a person who should be attentively monitored.

Thus, the indication color determination unit 2060 determines an indication color so that a monitoring target (person) has a darker color, as an index value becomes smaller. The presentation unit 2040 changes the color of a monitoring target and the color around the monitoring target in the captured image 10-2 to the determined indication color. As a result, the color of the person 20 and the color around the person are dark, and the color of the other people and the color around the other people are light. Here, similarly to the case of FIG. 9, FIGS. 11A and 11B show that color is darker as the size of a dot becomes larger. In addition, arrows drawn in FIG. 11B are used to illustrate that the person is moving, and it is not necessary to draw an arrow on a real captured image.

<Operational Advantages>

According to the image processing apparatus 2000 of the present exemplary embodiment, an indication color of a captured image is determined on the basis of the degree of change in the state of a monitoring target, and an indication using the indication color is presented on a presentation target image. For this reason, according to the image processing apparatus 2000 of the present exemplary embodiment, it is possible to intuitively ascertain the degree of change in the state of a monitoring target, as compared to a method of indicating an index value on a presentation target image as it is. Accordingly, an observer or the like viewing a presentation target image ascertains the current condition of the monitoring target more easily.

Third Exemplary Embodiment

An image processing apparatus 2000 according to a third exemplary embodiment has the same configuration as that of the image processing apparatus 2000 according to the first or second exemplary embodiment.

A presentation unit 2040 according to the third exemplary embodiment presents an indication for emphasizing a monitoring target on a presentation target image on the basis of the index value of the monitoring target. For example, the presentation unit 2040 presents an indication for emphasizing a monitoring target more as the index value thereof becomes larger, or presents an indication for emphasizing a monitoring target more as the index value thereof becomes smaller, on a presentation target image.

<Emphasizing Using Frame>

For example, the presentation unit 2040 presents a frame having a thickness depending on the largeness of an index value, around a monitoring target. In this case, for example, the presentation unit 2040 calculates a thickness b of a frame using the following Expression (2). Here, "b0" denotes an initial value of the thickness, "1" denotes an index value calculated by an index value calculation unit 2020, and "α" denotes a proportional constant. Note that, the shape of the frame that the presentation unit 2040 presents is arbitrary.

[Expression 2]

$$b = b_0 + \alpha \cdot I \qquad (2)$$

When a monitoring target is emphasized more as the monitoring target has a larger index value, the presentation unit 2040 makes a frame thicker as the index value thereof becomes larger. In this case, "b0" denotes the lower limit of the thickness, and "α" denotes a positive real number. On the other hand, when a monitoring target is emphasized more as the index value thereof becomes larger, the presentation unit 2040 makes a frame thicker as the index value thereof becomes smaller. In this case, "b0" denotes the upper of the thickness, and "α" denotes a negative real number.

Note that, the presentation unit 2040 may change the thickness of an outline of a monitoring target using the same method as the method of presenting a frame around a monitoring target. Specifically, the presentation unit 2040 presents an outline of a monitoring target to be emphasized.

In addition, the presentation unit 2040 may perform emphasizing by blinking a frame at a frequency based on the index value of a monitoring target. For example, when the presentation unit 2040 emphasizes a monitoring target more as the index value thereof becomes larger, the presentation unit further increases the number of blinking per unit time (shortens an interval of blinking) as the index value of a monitoring target for which a frame is presented becomes larger. Similarly, when the presentation unit 2040 emphasizes a monitoring target more as the index value thereof becomes smaller, the presentation unit further increases the number of blinking per unit time (shortens an interval of blinking) as the index value of a monitoring target for which a frame is presented becomes smaller.

«Specific Example»

Figure 12A:
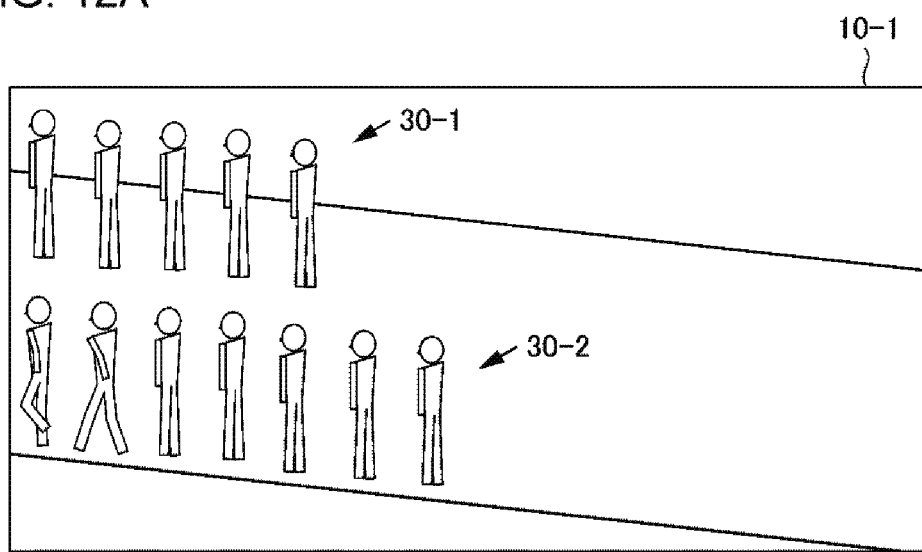
FIGS. 12A and 12B are diagrams conceptually illustrating that emphasizing is performed by presenting a frame around a monitoring target.
Figure 12B:
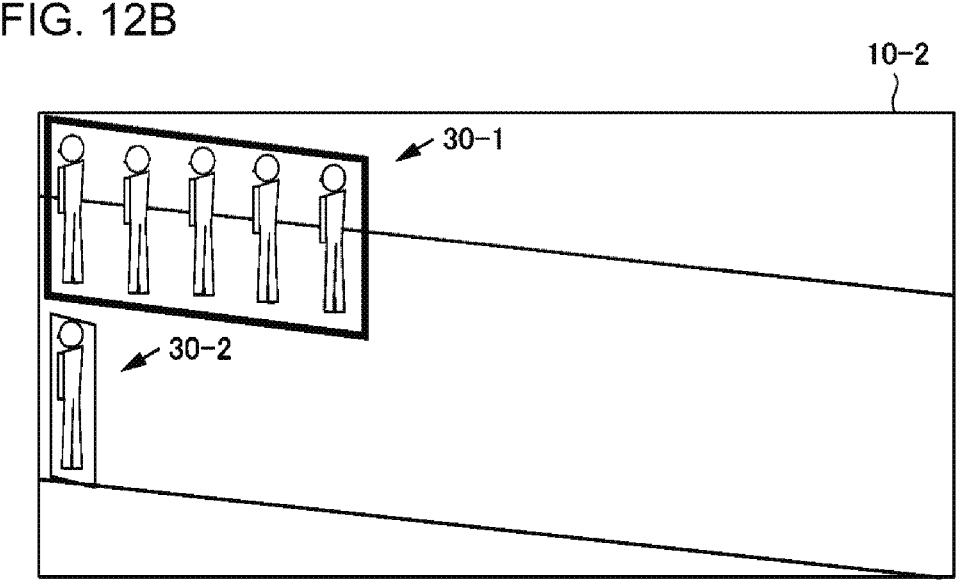

FIGS. 12A and 12B are diagrams conceptually illustrating that emphasizing is performed by presenting a frame around a monitoring target. Captured images 10-1 and 10-2 illustrated in FIGS. 12A and 12B are images obtained by capturing a queue of people in the same place at different times. Similarly to the cases of FIGS. 11A and 11B, the captured image 10-1 is an image captured prior to the captured image 10-2. Comparing the captured images 10-1 and 10-2 with each other, the length of an upper queue 30-1 does not change, and the length of a lower queue 30-2 significantly changes. Here, it is preferable that the length of the queue reduces along with time, and it is considered that a queue having a small degree of change in length should be observed carefully.

Thus, the presentation unit 2040 presents a frame around a monitoring target (person) so that the thickness of frame becomes larger as the index value thereof becomes smaller. In FIGS. 12A and 12B, a thicker frame is presented around of the queue 30-1, and a thinner frame is presented around the queue 30-2.

<Emphasizing Using Color>

In addition, an image processing apparatus 2000 according to the third exemplary embodiment may present an indication for emphasizing a monitoring target by changing the color of the monitoring target or the color around the monitoring target into an indication color, which is determined for the monitoring target, using the indication color determination unit 2060 described in the second exemplary embodiment. For example, the index value calculation unit 2020 emphasizes the monitoring target by increasing the density of the indication color of the monitoring target. In addition, the indication color determination unit 2060 constitutes an indication color of a monitoring target using a color map constituted by colors, which color is more noticeable as the color more closely corresponds to the index value of the monitoring target to be emphasized. For example, when a monitoring target is emphasized more as the index value thereof becomes larger, the indication color determination unit 2060 uses a color map having colors, which color is more noticeable (red or the like) as the color corresponds to a larger index value and which color is less noticeable (gray or the like) as the color corresponds to a smaller index value.

Here, it is also possible to realize the changing of the color around a monitoring target into a certain color by presenting a frame having the color near the monitoring target. In this case, the presentation unit 2040 may make the thickness of the frame constant regardless of an index value or may make the thickness of the frame vary depending on an index value. A method of determining the thickness of a frame depending on an index value is as described above.

«Specific Example»

Figure 13A:
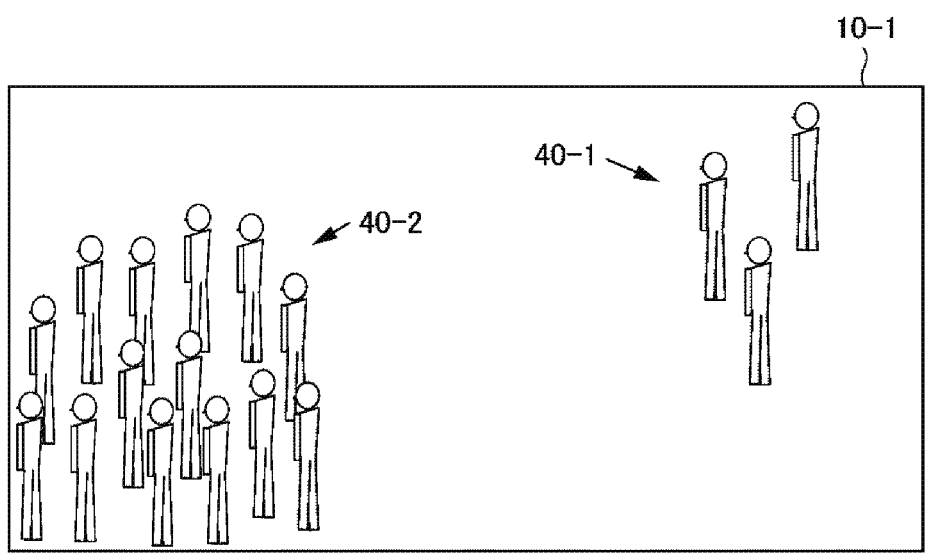
FIGS. 13A and 13B are diagrams conceptually illustrating that emphasizing is performed by presenting a frame having a color and width corresponding to an index value around a monitoring target.
Figure 13B:
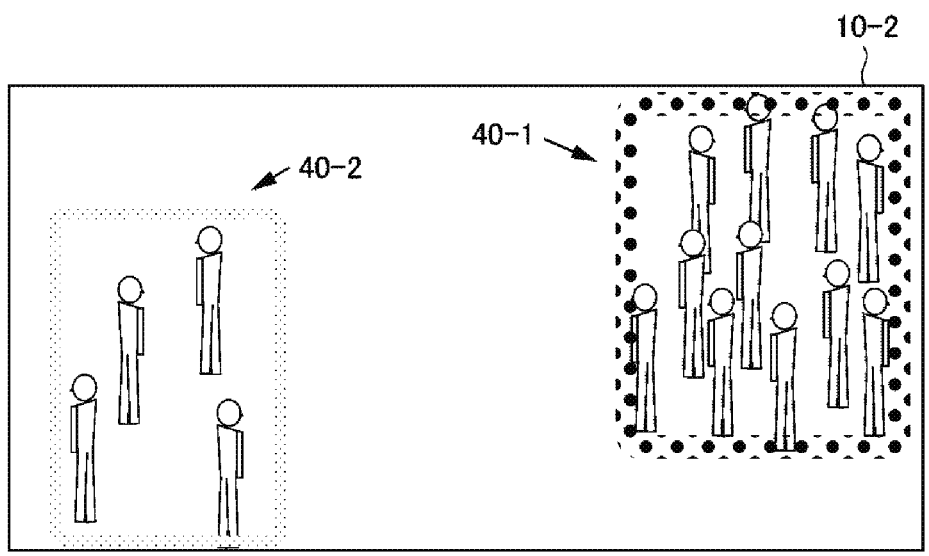

FIGS. 13A and 13B are diagrams conceptually illustrating that emphasizing is performed by presenting a frame having a color and size based on an index value around a monitoring target. Captured images 10-1 and 10-2 illustrated in FIGS. 13A and 13B are images obtained by capturing a crowd in the same place at different times. Similarly to the cases of FIGS. 11A and 11B and FIGS. 12A and 12B, the captured image 10-1 is an image captured prior to the captured image 10-2. Comparing the captured images 10-1 and 10-2 with each other, the number of people included in upper right crowd 40-1 increases, and the number of people included in a lower left crowd 40-2 decreases.

In this case, the indication color determination unit 2050 determines an indication color so that the color of a crowd becomes darker as the number of people in the crowd increases. In addition, the presentation unit 2040 determines the thickness of a frame so that the frame becomes thicker as the degree of increase in the number of people of the crowd becomes higher. As a result, the presentation unit 2040 presents a thick and dark frame around the crowd 40-1 in which the number of people significantly increases, and presents a thin and light frame around the crowd 40-2 in which the number of people does not significantly increase.

<Operational Advantages>

According to the image processing apparatus 2000 of the present exemplary embodiment, an indication, which is for emphasizing a monitoring target to the extent based on the index value of a monitoring target, is presented on a presentation target image. Therefore, an observer or the like viewing the presentation target image can immediately ascertain the degree of change in each monitoring target and can immediately ascertain to what extent each monitoring target should be monitored attentively.

Fourth Exemplary Embodiment

Figure 14:
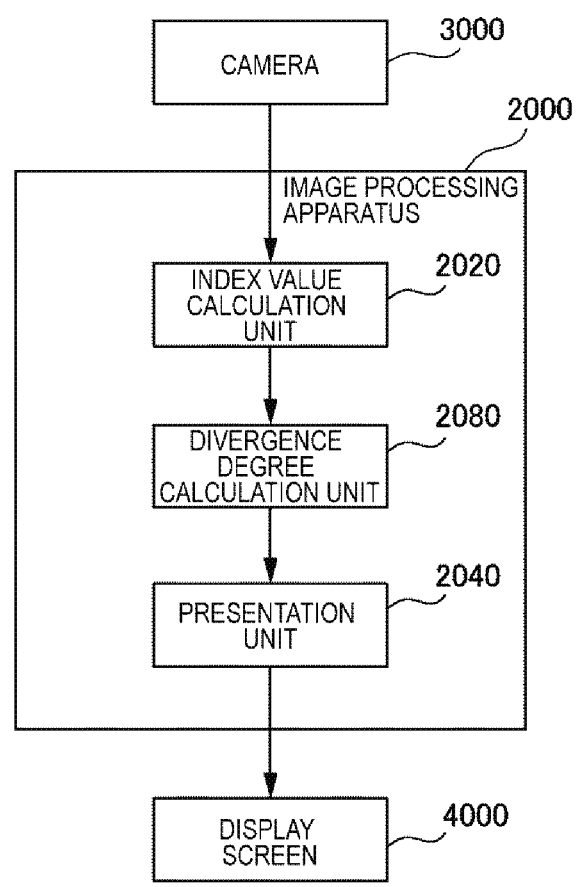
FIG. 14 is a block diagram illustrating an image processing apparatus according to a fourth exemplary embodiment.

FIG. 14 is a block diagram illustrating an image processing apparatus 2000 according to a fourth exemplary embodiment. In FIG. 14, an arrow indicates a flow of information. Further, in FIG. 14, each block indicates a function-based configuration instead of a hardware-based configuration.

The image processing apparatus 2000 according to the fourth exemplary embodiment presents an indication on a first image on the basis of how much the degree of change in the state of a monitoring target deviates from a reference degree of change. Thereby, the image processing apparatus 2000 according to the fourth exemplary embodiment includes a divergence degree calculation unit 2080.

The divergence degree calculation unit 2080 calculates the degree of divergence between an index value calculated by an index value calculation unit 2020 and a reference degree of change. A presentation unit 2040 according to the fourth exemplary embodiment presents an indication for emphasizing a monitoring target more as the degree of divergence thereof becomes higher, on a monitoring target.

Here, the divergence degree calculation unit 2080 acquires a reference degree of change from a storage unit provided inside or outside the image processing apparatus 2000. Here, the reference degree of change may vary according to what is handled as the state of a monitoring target. In this case, the storage unit may store the reference degree of change for each state of a monitoring target.

<Method of Calculating Degree of Divergence>

There are various methods for the divergence degree calculation unit 2080 to calculate the degree of divergence. For example, the divergence degree calculation unit 2030 calculates a degree of divergence k using the following Expression (3). Here, "I" denotes an index value calculated for a monitoring target, and "$I_{base}$" denotes a reference degree of change. However, a method of calculating a degree of divergence is not limited to the following method.

[Expression 3]

$$k = \frac{I - I_{base}}{I_{base}} \quad (3)$$

<Emphasizing Using Color>

For example, the image processing apparatus 2000 according to the fourth exemplary embodiment changes the color of a monitoring target on the basis of the degree of divergence. In this case, the image processing apparatus 2000 according to the fourth exemplary embodiment includes an indication color determination unit 2060.

The indication color determination unit 2060 according to the fourth exemplary embodiment determines the color of a monitoring target and the color around the monitoring target using the same method as that used by the indication color determination unit 2060 described in the second exemplary embodiment. For example, the indication color determination unit 2060 determines the density of the color of a monitoring target on the basis of the degree of divergence calculated for the monitoring target. In this case, the indication color determination unit 2060 minimizes the density when the degree of divergence is 0, and makes the color of the monitoring target darker as the degree of divergence becomes higher. Note that, when this method is used, the degree of divergence is expressed by an absolute value of divergence between an index value and a reference value if a negative value can be taken for the index value. For example, the degree of divergence is expressed by an absolute value of a value calculated using Expression (3).

Figure 15:
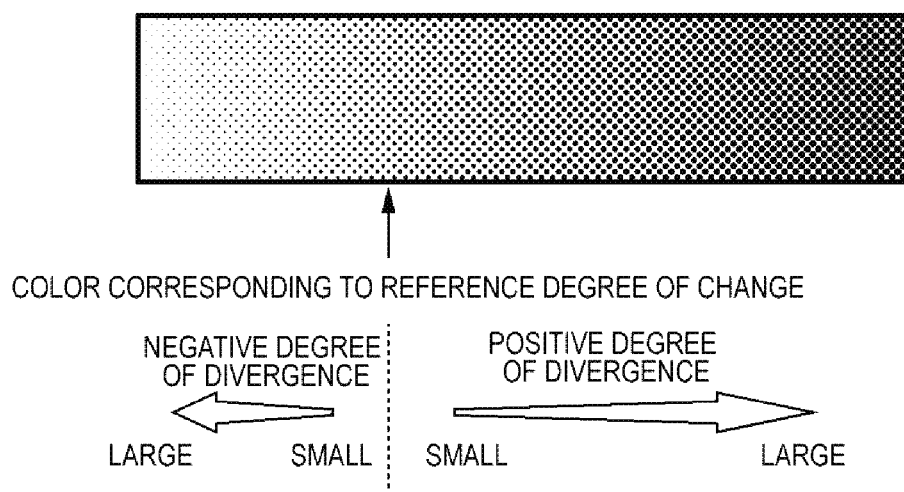
FIG. 15 is a diagram conceptually illustrating a method of determining the density of an indication color on the basis of the degree of divergence when a reference density is determined.

In addition, the indication color determination unit 2060 sets the density of the color of a monitoring target when be degree of divergence is 0 as a reference density. The indication color determination unit makes the color of a monitoring target darker as the degree of divergence becomes higher in a positive direction (becomes larger than a reference value), and makes the color of the monitoring target lighter as the degree of divergence becomes higher in a negative direction (becomes smaller than the reference value). FIG. 15 is a diagram conceptually illustrating a method of determining the density of an indication color on the basis of the degree of divergence when a reference density is determined. For example, the indication color determination unit 2060 sets the density of the color corresponding to a reference degree of change as the density of the original color of a monitoring target. In other words, when the degree of divergence is 0, the density of the color of the monitoring target does not makes the color of a monitoring target darker than the original color when an index value is larger than a reference degree of change (when the degree of divergence has a positive value), and makes the color of the monitoring target lighter than the original color when the index value is smaller than the reference degree of change (when the degree of divergence has a negative value).

Note that, when using the density of any one of RGB colors described in the second exemplary embodiment or using a specific color map, a method of determining an indication color on the basis of the degree of divergence is also the same as the method of changing the density of the color of a monitoring target on the basis of the above-mentioned degree of divergence.

<Indication for Emphasizing>

The presentation unit 2040 may present an indication for emphasizing a monitoring target on the basis of the degree of divergence calculated for the monitoring target, using the same method as the method described in the third exemplary embodiment.

<Emphasizing Using Frame>

For example, as is the case with the third exemplary embodiment, the presentation unit 2040 performs emphasizing using a frame and color. In this case, for example, the presentation unit 2040 determines a thickness b' of a frame of a monitoring target according to Expression (4). Here, "k" denotes the above-mentioned degree of divergence. For example, when a is set to be a positive real number, the frame becomes thicker as the degree of divergence becomes higher.

[Expression 4]

$$b' = b_0 + \alpha \cdot k \quad (4)$$

In addition, as is the case with the third exemplary embodiment, the presentation unit 2040 may perform emphasizing by changing the thickness of an outline of a monitoring target in accordance with the degree of divergence or by blinking the frame at a frequency based on the degree of divergence.

<Emphasizing Using Color>

Similarly to the indication color determination unit 2060 according to the third exemplary embodiment, the indication color determination unit 2060 according to the fourth exemplary embodiment may present an indication for emphasizing a monitoring target by changing an indication color of the monitoring target. Specifically, when the indication color determination unit 2060 emphasizes a monitoring target more as the degree of divergence thereof becomes higher, the indication color determination unit determines an indication color by making the indication color darker as the degree of divergence becomes higher or by using a color map constituted by colors, which color is more noticeable as the degree of divergence of the monitoring target becomes higher. Similarly, when the indication color determination unit 2060 emphasizes a monitoring target more as the degree of divergence thereof becomes lower, the indication color determination unit determines an indication color by making the indication color darker as the degree of divergence becomes lower or by using a color map constituted by colors, which color is more noticeable as the color corresponds to a lower degree of divergence.

<Operational Advantages>

According to the present exemplary embodiment, an indication for emphasizing a monitoring target is presented on a presentation target image on the basis of how much the degree of change in the state of a monitoring target deviates from a reference degree of change. It is possible to more accurately obtain the degree to which the monitoring target should be emphasized by introducing the reference degree of change. Accordingly, an observer or the like can more accurately ascertain the degree to which monitoring should be attentively performed, with respect to each monitoring target.

Fifth Exemplary Embodiment

The configuration of an image processing apparatus 2000 according to a fifth exemplary embodiment is shown by FIG. 1, as is the case with the first exemplary embodiment.

An index value calculation unit 2020 according to the fifth exemplary embodiment calculates a predicted value of the degree of change in the state of a monitoring target, on the basis of the calculated degree of change in the state of the monitoring target, at and after the time when each image used for the calculation is captured. The index value calculation unit 2020 sets the predicted value calculated for the monitoring target as the index value of the monitoring target.

For example, the index value calculation unit 2020 calculates a predicted value of the degree of change in the state of a monitoring target after predetermined time of time t, by using a plurality of images captured over a predetermined period of time in the past from the time t. An indication based on the predicted value is presented on a presentation target image, which is presented on a display screen at the time t.

For example, the index value calculation unit 2020 generates a model for predicting the state of a monitoring target using the acquired plurality of captured images. Note that, since a method of generating a predicting model from a sample value is a known method, the detailed description thereof will not be described here. The index value calculation unit 2020 calculates a predicted value of the degree of change in the state of the monitoring target at and after the time of capturing the images used for the generation of the model, using the model for predicting the state of the monitoring target generated from the acquired plurality of captured images.

Suppose that a model for predicting the state of a monitoring target is expressed by f(t). Here, "t" denotes time, and "f(t)" denotes a predicted value of the state of the monitoring target at the time t. In this case, for example, the index value calculation unit 2020 calculates the degree of change in the state of the monitoring target between time t1 and time t2 in the future, using the following Expression (5). Here, "a" denotes a predicted value of the degree of change in the state of the monitoring target. Note that, the following Expression (5) is just an example, and the method of calculating a predicted value is not limited to a method using Expression (5).

[Expression 5]

$$a = \frac{f(t_2) - f(t_1)}{t_2 - t_1} \quad (5)$$

Note that, "t1" may be time in the future, may be the current time, or may be time in the past. When t1 is the current time or time in the past, the value of f(t) may be calculated on the basis of a measured value instead of being calculated using a predicting model.

In addition, the index value calculation unit 2020 may calculate a predicted value of the degree of change in the state of a monitoring target using a predicting model provided in advance. In this case, the index value calculation unit 2020 uses the state of each monitoring target in an acquired captured image as an input to the predicting model. The predicting model may be stored inside or outside the index value calculation unit 2020.

Further, when an indication based on a predicted value is presented on an image captured by a certain camera 3000-1, the index value calculation unit 2020 may use an image captured by another camera 3000 located around the camera 3000-1. For example, the index value calculation unit 2020 analyzes an image captured by a camera 3000-2 adjacent to the camera 3000-1. As a result, suppose that a crowd is heading toward a place within an imaging range of the camera 3000-1. In this case, the presentation unit 2040 presents an indication based on a predicted value of the degree of change in the state calculated for the crowd, in a region to which the crowd is predicted to move in the image captured by the camera 3000-1. Specifically, the presentation unit 2040 performs a process of changing the color of the region into which the crowd is predicted to flow in the image captured by the camera 3000-1 or a process of surrounding the region with a frame.

<Operational Advantages>

According to the present exemplary embodiment, an indication based on a predicted value of the degree of change in the state of a monitoring target is presented on a presentation target image. Therefore, an observer or the like can immediately ascertain that the future action of a monitoring target should be observed carefully.

Sixth Exemplary Embodiment

In a sixth exemplary embodiment, in terms of images captured by a certain camera 3000 (hereinafter, a camera 3000-1), there are a period of time during which they are displayed on a display screen 4000, and another period of time during which they are not displayed thereon. For example, there is a case where images captured by the plurality of cameras 3000 are displayed on one display screen 4000 in a time-division manner.

Here, when the images captured by the camera 3000-1 are not displayed during a period of time and are displayed after the period of time on the display screen 4000, an index value calculation unit 2020 according to the sixth exemplary embodiment calculates an index value of a monitoring target on the basis of the degree of change in the state of the monitoring target before and after that period of time.

Figure 16:
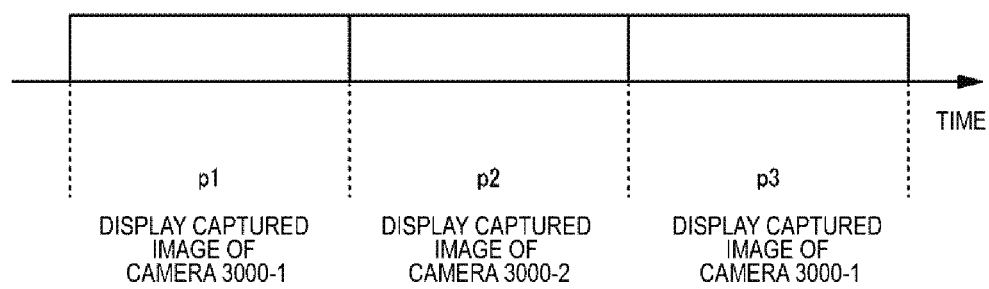
FIG. 16 is a diagram conceptually illustrating that images captured by a plurality of cameras are displayed on a display screen in a time-division manner.

FIG. 16 is a diagram conceptually illustrating that images captured by the plurality of cameras 3000 are displayed on the display screen 4000 in a time-division manner. In the case of FIG. 16, images captured by the camera 3000-1 are displayed during periods of time p1 and p3, and images captured by another camera 3000-2 are displayed during a period of time p2. In this case, the index value calculation unit 2020 calculates an index value on the basis of the degree of change between the state of a monitoring target before the period of time p2 and the state of the monitoring target after the period of time p2. Hereinafter, a period of time (p2 or the like in FIG. 16) during which the images captured by the camera 3000-1 are not displayed on the display screen 4000 is described as a non-displayed period.

Figure 17:
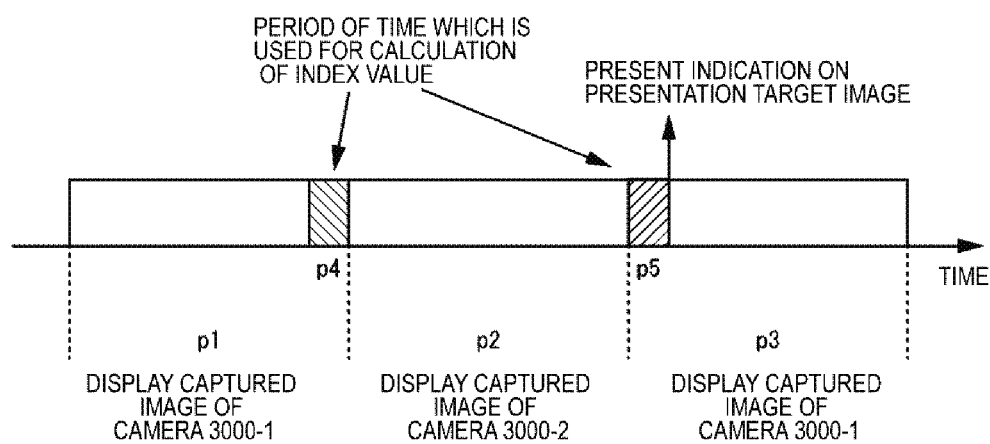
FIG. 17 is a diagram illustrating a method for an index value calculation unit to calculate an index value, according to a sixth exemplary embodiment.

For example, the index value calculation unit 2020 calculates an index value used for presentation after the elapse of a non-displayed period, using a predetermined number of captured images presented on the display screen 4000 before the non-displayed period and captured images for a predetermined time (a predetermined number of captured images) which are presented on the display screen 4000 after the non-displayed period. FIG. 17 is a diagram illustrating a method for the index value calculation unit 2020 to calculate an index value, according to the sixth exemplary embodiment. Periods of time p1, p2, and p3 are the same as those in FIG. 16. The index value calculation unit 2020 calculates an index value of a monitoring target using captured images displayed on the display screen 4000 during a period of time p4, which is a portion of the period of time p1, and captured images displayed on the display screen 4000 during a period of time p5, which is a portion of the period of time p3. The presentation unit 2040 presents an indication based on the calculated index value on a presentation target image displayed on the display screen 4000 at time t. Note that, the length of the period of time p4 and the length of the period of time p5 may be the same as each other or may be different from each other.

For example, the presentation unit 2040 continues presenting an indication based on the degree of change in the state of a monitoring target between the period of time p4 and the period of time p5 on captured images for a predetermined period of time (for example, for ten seconds) from the time t in order for an observer or the like to be able to sufficiently ascertain the degree of change in the state of the monitoring target before and after the period of time p2.

Figure 18:
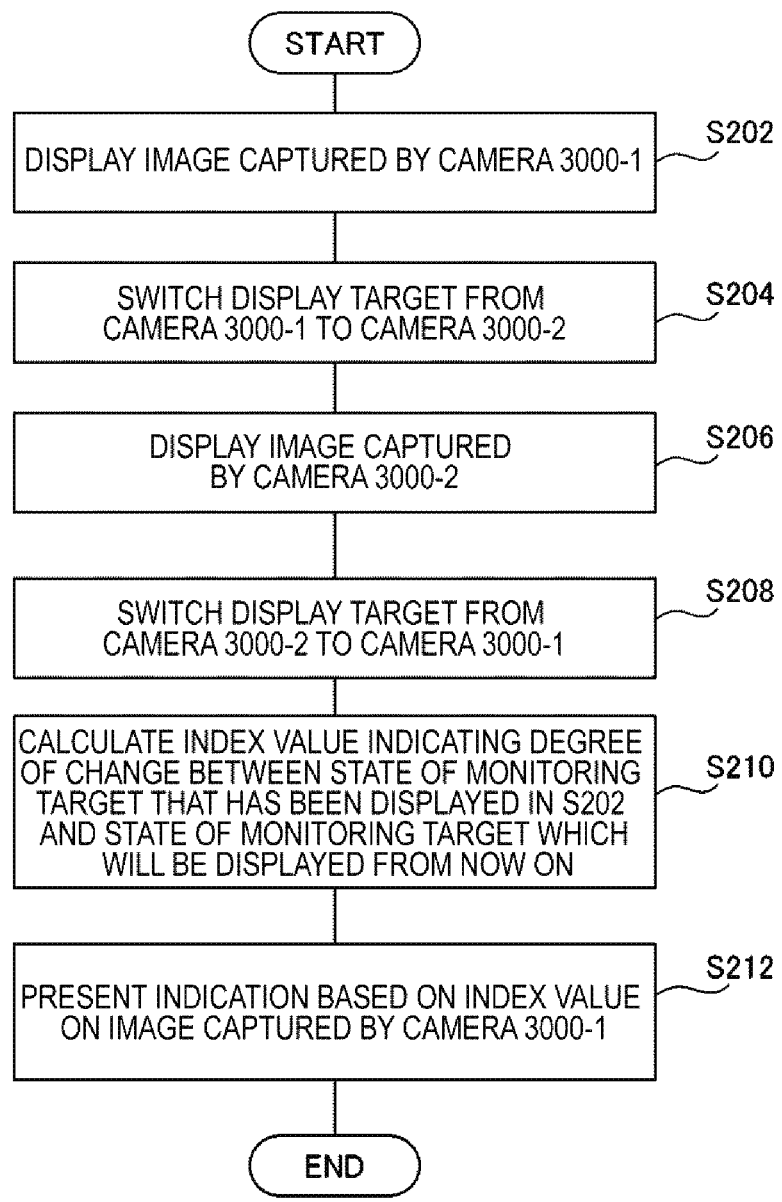
FIG. 18 is a flow chart illustrating a flow of processing performed by an image processing apparatus according to the sixth exemplary embodiment.

FIG. 18 is a flow chart illustrating a flow of processing performed by the image processing apparatus 2000 according to the sixth exemplary embodiment. In step S202, the display screen 4000 displays images captured by the camera 3000-1. In step S204, an indication target of the display screen 4000 is switched from the camera 3000-1 to the camera 3000-2. In step S206, the display screen 4000 displays images captured by the camera 3000-2. In step S208, the display target of the display screen 4000 is switched from the camera 3000-2 to the camera 3000-1.

In step S210, the index value calculation unit 2020 calculates an index value indicating the degree of change between the state of a monitoring target that was displayed in S202 and the state of a monitoring target that will be displayed from now on. In step S212, the index value calculation unit 2020 presents an indication based on the calculated index value on the images captured by the camera 3000-1. The captured images on which the indication is presented are displayed on the display screen 4000.

Note that, if a period of time during which the images captured by the camera 3000-1 are not displayed on the display screen 4000 is shorter than a predetermined period of time, the index value calculation unit 2020 may regard that as "the images captured by the camera 3000-1 are continuously being displayed on the display screen 4000" This is because it is considered that, for example, an observer may be regarded as having been continuously viewing an image of the same camera, if a camera of the display target is switched to another camera for merely a short period of time, such as approximately one second.
<Operational Advantages>

According to the present exemplary embodiment, when images captured by the camera 3000-1 are not displayed during a period of time and are displayed after the period of time on the display screen 4000, an index value indicating the degree of change in the state of a monitoring target before and after the monitoring target is calculated. In this manner, for example, when the channel of the display screen 4000 is switched again to the images of the camera 3000-1 after the channel of the display screen 4000 is switched from the images of the camera 3000-1 to the images of the camera 3000-2, an observer or the like can immediately ascertain how much the state of each monitoring target has changed, compared to when the image of the camera 3000-1 was viewed last time. Accordingly, even when it is difficult to continue monitoring only images captured by a specific camera 3000, it is possible to immediately ascertain the degree of change in the state of a monitoring target captured by a certain camera 3000 at the time of viewing images captured by the camera 3000.

Seventh Exemplary Embodiment

An image processing apparatus 2000 according to a seventh exemplary embodiment is shown by FIG. 1, similar to the image processing apparatus 2000 according to the first exemplary embodiment.

For example, there is a case where an observer or the like viewing a display screen 4000 cannot carefully observe the entire display screen 4000 at one time, such as a case where the display screen 4000 has a large size. Thus, an index value calculation unit 2020 according to the seventh exemplary embodiment calculates an index value indicating the degree of change in the state of a monitoring target before and after a period of time during which a certain partial region of the display screen 4000 (hereinafter, a first partial region) has not corresponded to the direction of the eye gaze of a user (observer or the like), with respect to the monitoring target displayed in the first partial region. A presentation unit 2040 according to the seventh exemplary embodiment presents an indication based on the calculated index value on a region displayed in the first partial region in the captured image displayed after the above-mentioned period of time.

Figure 19:
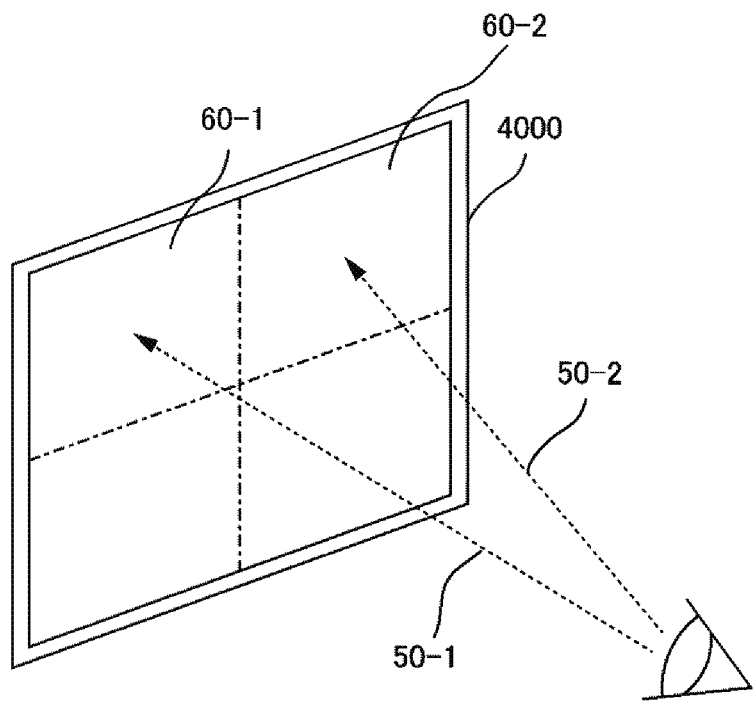
FIG. 19 is a diagram illustrating a relationship between a user's eye gaze direction and a partial region.

FIG. 19 is a diagram illustrating a relationship between a user's eye gaze direction and a partial region. In FIG. 19, an eye gaze direction 50-1 corresponds to a partial region 60-1, and an eye gaze direction 50-2 corresponds to a partial region 60-2. Note that, for the purpose of simplifying the drawing, an eye gaze direction corresponding to a partial region is shown by one arrow, but an eye gaze direction corresponding to a partial region actually has a certain degree of width. For example, the eye gaze direction 50-1 may be an eye gaze direction with which the partial region 60-1 is included in a user's eyesight so that the user can carefully observe a monitoring target included in the partial region 60-1.

A basic principle of a process performed by the index value calculation unit 2020 according to the seventh exemplary embodiment is the same as the principle of the process performed by the index value calculation unit 2020 according to the sixth exemplary embodiment. Specifically, the index value calculation unit 2020 handles "a period of time during which a partial region is included in a region corresponding to the user's eye gaze direction" in the same manner as "a period of time during which images captured by a camera 3000-1 are displayed on the display screen 4000" in the sixth exemplary embodiment. In addition, the index value calculation unit 2020 handles "a period of time during which the partial region is not included in the region corresponding to the user's eye gaze direction" in the same manner as "a period of time during which the images captured by the camera 3000-1 are not displayed on the display screen 4000" in the sixth exemplary embodiment.
<Acquisition of User's Eye Gaze Direction>

The index value calculation unit 2020 acquires a user's eye gaze direction. For example, the eye gaze direction is represented by a combination of "an angle in a horizontal direction and an angle in a vertical direction". Here, a reference of each of the angle in the horizontal direction and the angle in the vertical direction (direction for setting 0 degrees) is arbitrary.

For example, the user's eye gaze direction is calculated by capturing the face and eyes of the user using a camera or the like and analyzing the captured image. The camera capturing the face and eyes of the user is installed, for example, near the display screen 4000. Since a technique of capturing images of the face and eyes of a user and thereby detecting an eye gaze direction are known techniques, the detailed description thereof will not be described here. Note that, a processing unit detecting the user's eye gaze direction (hereinafter, an eye gaze direction detection unit) may be provided inside or outside the image processing apparatus 2000.

<Specific Method>

For example, the index value calculation unit 2020 handles the display screen 4000 by dividing the display screen into a predetermined number of partial regions. The index value calculation unit 2020 acquires the observer's eye gaze direction from the eye gaze direction detection unit and determines to which partial region the eye gaze direction corresponds. When the determined partial region is different from a partial region determined last time, it is ascertained that the partial region corresponding to the user's eye gaze direction has changed.

FIG. 20 is a diagram illustrating information in which a partial region corresponding to an observer's eye gaze direction and the time when the observer's eye gaze direction has changed, in a table format. The table is named as an eye-gaze information table 100. The eye-gaze information table 100 includes two columns of a time 102 and a partial region ID 104. In each record of the eye-gaze information table 100, an ID of a partial region included in the user's eye gaze direction from the time shown in the point in time 102 is shown in the partial region ID 104.

In FIG. 20, at the time t1 and the time t4, a region corresponding to the observer's eye gaze direction is a partial region 1. Thus, the index value calculation unit 2020 calculates an index value indicating the degree of change between a state of a monitoring target during a period of time between the time t1 and the time t2 (a period of time during which the partial region 1 corresponds to the user's eye gaze direction) and a state of the monitoring target at and after the time t4 (at and after the time when the partial region 1 corresponds to the user's eye gaze direction again), as an index value of the monitoring target.

Note that, if a period of time during which the user's eye gaze direction is changed to another partial region side is shorter than a predetermined period of time, the index value calculation unit 2020 may regard that as "the user having continuously viewed the same partial region". This is because it is considered that, for example, "an observer may be regarded as having been continuously viewing a certain partial region" if the observer takes her/his eyes off the partial region for a short period of time, such as approximately one second.

In addition, the index value calculation unit 2020 may use the orientation of a user's face instead of the user's eye gaze direction. A method of acquiring and using the orientation of the user's face is the same as a method of detecting and using the user's eye gaze direction.

<Operational Advantages>

According to the present exemplary embodiment, when there is a period of time during which a certain region is not monitored, it presents an indication indicating the degree of change in the state of each monitoring target from the time when the region was viewed last time on the display screen 4000 when the region is viewed again. Therefore, an observer or the like can immediately ascertain the degree of change in the state of a monitoring target in each region even when the entire region of the display screen 4000 cannot be monitored at one time.

Modification Example 7-1

An image processing apparatus 2000 according to a modification example 7-1 described below may be realized so as to have the same configuration as the image processing apparatus 2000 according to the seventh exemplary embodiment. In the image processing apparatus 2000 according to the modification example 7-1, a display screen 4000 includes a plurality of small screens 4100. Images captured by different cameras 3000 are displayed on the respective small screens 4100.

An index value calculation unit 2020 according to the modification example 7-1 calculates an index value indicating the degree of change in the state of a monitoring target before and after a period of time during which a certain small screen 4100-1 is not included in a region corresponding to the user's eye gaze direction, with respect to the monitoring target displayed on the small screen 4100-1. A presentation unit 2040 according to the modification example 7-1 presents an indication based on the calculated index value on a captured image displayed on the small screen 4100-1 after that period of time.

The small screen 4100 can be handled in the same manner as the partial region in the seventh exemplary embodiment. For this reason, a basic principle of a process performed by the index value calculation unit 2020 according to the modification example 7-1 is the same as the principle of the process performed by the index value calculation unit 2020 according to the seventh exemplary embodiment. Specifically, the index value calculation unit 2020 handles "a period of time during which the small screen 4100-1 is included in the user's eye gaze direction" in the same manner as "the period of time during which the partial region is included in the user's eye gaze direction" in the seventh exemplary embodiment. In addition, the index value calculation unit 2020 handles "a period of time during which the small screen 4100-1 is not viewed by an observer" in the same manner as "the period of time during which the partial region is not included in the user's eye gaze direction" in the seventh exemplary embodiment.

The exemplary embodiments of the invention have been described so far with reference to the accompanying drawings. However, the exemplary embodiments are merely illustrative of the invention, and other various configurations can also be adopted.

Hereinafter, examples of reference configurations will be added.

(1) An image processing apparatus including:

an index value calculation unit calculating an index value indicating a degree of change in a state of a monitoring target in a plurality of captured images using the captured images, the captured images being captured by a camera at different times; and a presentation unit presenting an indication based on the index value on a first captured image captured by the camera.

(2) The image processing apparatus according to (1), further including a first indication color determination unit determining an indication color based on the index value, with respect to the monitoring target, wherein the presentation unit changes a color of the monitoring target or a color around the monitoring target into the indication color determined for the monitoring target, in the first captured image.

(3) The image processing apparatus according to (1) or (2), wherein the presentation unit presents an indication for emphasizing a monitoring target more as the index value of the monitoring target becomes larger, or presents an indication for emphasizing a monitor target more as the index value of the monitoring target becomes smaller.

(4) The image processing apparatus according to (1), further including a divergence degree calculation unit calculating a degree of divergence between the index value and a reference degree of change, wherein the presentation unit presents an indication for emphasizing a monitoring target more as the degree of divergence of the monitoring target becomes higher, or presents an indication for emphasizing a monitoring target more as the degree of divergence of the monitoring target becomes lower in the first captured image.

(5) The image processing apparatus according to (4), further including a second indication color determination unit determining an indication color based on the degree of divergence calculated for the monitoring target, with respect to the monitoring target, wherein the presentation unit changes a color of the monitoring target or a color around the monitoring target into the indication color determined for the monitoring target, in the first captured image.

(6) The image processing apparatus according to any one of (1) to (5), wherein the index value calculation unit calculates a predicted value of the degree of change in the state of the monitoring target at and after a time when each image used for the calculation is captured, the calculation of the predicted value being performed using the calculated degree of change in the state of the monitoring target, and wherein the index value calculation unit sets the predicted value as the index value.

(7) The image processing apparatus according to any one of (1) to (6), wherein when an image captured by the camera is not displayed during a certain period of time on a display screen for displaying the captured image, the index value calculation unit calculates the index value indicating a degree of change between a state of a monitoring target presented before the period of time and a state of the monitoring target presented after the period of time, and wherein the presentation unit uses a captured image displayed after the period of time as the first captured image.

(8) The image processing apparatus according to any one of (1) to (7), wherein when a first partial region of a display screen for displaying the captured image is not included in a screen region corresponding to an eye gaze direction or a face direction of a user viewing the display screen during a certain period of time, the index value calculation unit calculates an index value indicating a degree of change between a state of the monitoring target presented on a first partial region before the period of time and a state of the monitoring target presented in the first partial region after the period of time, and wherein the presentation unit presents an indication based on the index value calculated for the first partial region on a region presented in the first partial region in the first captured image, using the captured image presented after the period of time as the first captured image.

(9) The image processing apparatus according to any one of (1) to (8), wherein the index value calculation unit calculates an index value indicating a degree of change in a position of the monitoring target.

(10) The image processing apparatus according to any one of (1) to (9), wherein the index value calculation unit calculates an index value indicating a degree of change in a frequency at which the monitoring target is shown in the image.

(11) The image processing apparatus according to any one of (1) to (10), wherein the index value calculation unit calculates an index value indicating a degree of change in a degree of crowdedness of a plurality of objects included in the monitoring target.

(12) The image processing apparatus according to any one of (1) to (11), wherein the monitoring target includes a queue of objects, and wherein the index value calculation unit calculates an index value indicating a degree of change in length or speed of the queue.

(13) The image processing apparatus according to any one of (1) to (12), wherein the index value calculation unit calculates an index value indicating a degree of change in the number of objects included in the monitoring target.

(14) The image processing apparatus according to any one of (1) to (13), wherein the monitoring target includes a person, and wherein the index value calculation unit calculates an index value indicating a degree of change in a degree of dissatisfaction of the monitoring target, as the index value of the monitoring target.

(15) The image processing apparatus according to any one of (1) to (14), wherein the monitoring target includes a person or a place, and wherein the index value calculation unit calculates an index value indicating a degree of change in a degree of risk of the monitoring target, as the index value of the monitoring target.

(16) The image processing apparatus according to any one of (1) to (15), wherein the monitoring target includes a person or a place, and wherein the index value calculation unit calculates an index value indicating a degree of change of how sufficiently the monitoring target is monitored, as the index value of the monitoring target.

(17) A monitoring system including:

a camera;

a display screen; and the image processing apparatus according to any one of (1) to (16), wherein the camera generates a plurality of captured images by performing image capturing at different times, and wherein the display screen displays the first captured image on which an indication based on the index value is presented by the presentation unit.

(18) An image processing method performed by a computer, the method including:

calculating an index value indicating a degree of change in a state of a monitoring target in a plurality of captured images using the captured images, the captured images being captured by a camera at different times; and presenting an indication based on the index value on a first captured image captured by the camera.

(19) The image processing method according to (18), further including determining an indication color based on the index value, with respect to the monitoring target, wherein the step of presenting an indication includes changing a color of the monitoring target or a color around the monitoring target into the indication color determined for the monitoring target, in the first captured image.

(20) The image processing method according to (18) or (19), wherein the step of presenting an indication includes presenting an indication for emphasizing a monitoring target more as the index value thereof becomes larger, or presents an indication for emphasizing a monitoring target more as the index value thereof becomes smaller.

(21) The image processing method according to (18) further including calculating a degree of divergence between the index value and a reference degree of change, wherein the step of presenting an indication includes presenting an indication for emphasizing a monitoring target more as the degree of divergence thereof becomes higher, or presenting an indication for emphasizing a monitoring target more as the degree of divergence thereof becomes lower in the first captured image.

(22) The image processing method according to (21) further including determining an indication color based on the degree of divergence calculated for the monitoring target, with respect to the monitoring target, wherein the step of presenting an indication includes changing a color of the monitoring target or a color around the monitoring target into the indication color determined for the monitoring target, in the first captured image.

(23) The image processing method according to any one of (18) to (22), wherein the step of calculating an index value includes calculating a predicted value of the degree of change in the state of the monitoring target at and after a time when each image used for the calculation is captured, the calculation of the predicted value being performed using the calculated degree of change in the state of the monitoring target, and wherein the step of calculating an index value includes setting the predicted value as the index value.

(24) The image processing method according to any one of (18) to (23), wherein when an image captured by the camera is not displayed during a certain period of time on a display screen for displaying the captured image, the step of calculating an index value includes calculating the index value indicating a degree of change between a state of a monitoring target presented before the period of time and a state of the monitoring target presented after the period of time, and wherein the step of presenting an indication includes using a captured image displayed after the period of time as the first captured image.

(25) The image processing method according to any one of (18) to (24), wherein when a first partial region of a display screen for displaying the captured image is not included in a screen region corresponding to an eye gaze direction or a face direction of a user viewing the display screen during a certain period of time, the step of calculating an index value includes calculating an index value indicating a degree of change between a state of the monitoring target presented on a first partial region before the period of time and a state of the monitoring target presented in the first partial region after the period of time, and wherein the step of presenting an indication includes presenting an indication based on the index value calculated for the first partial region on a region presented in the first partial region in the first captured image, using the captured image presented after the period of time as the first captured image.

(26) The image processing method according to any one of (18) to (25), wherein the step of calculating an index value includes calculating an index value indicating a degree of change in a position of the monitoring target.

(27) The image processing method according to any one of (18) to (26), wherein the step of calculating an index value includes calculating an index value indicating a degree of change in a frequency at which the monitoring target is shown in the image.

(28) The image processing method according to any one of (18) to (27), wherein the step of calculating an index value includes calculating an index value indicating a degree of change in a degree of crowdedness of a plurality of objects included in the monitoring target.

(29) The image processing method according to any one of (13) to (28), wherein the monitoring target includes a queue of objects, wherein the step of calculating an index value includes calculating an index value indicating a degree of change in length or speed of the queue.

(30) The image processing method according to any one of (18) to (29), wherein the step of calculating an index value includes calculating an index value indicating a degree of change in the number of objects included in the monitoring target.

(31) The image processing method according to any one of (18) to (30), wherein the monitoring target includes a person, and wherein the step of calculating an index value includes calculating an index value indicating a degree of change in a degree of dissatisfaction of the monitoring target, as the index value of the monitoring target.

(32) The image processing method according to any one of (18) to (31), wherein the monitoring target includes a person or a place, and wherein the step of calculating an index value includes calculating an index value indicating a degree of change in a degree of risk of the monitoring target, as the index value of the monitoring target.

(33) The image processing method according to any one of (18) to (32), wherein the monitoring target includes a person or a place, and wherein the step of calculating an index value includes calculating an index value indicating a degree of change of how sufficiently the monitoring target is monitored, as the index value of the monitoring target.

(34) A program causing a computer to operate as the image processing apparatus according to any one of (1) to (16),

(35) An image processing apparatus comprising:

a calculation unit calculating a degree of change in a state of a monitoring target in a plurality of captured images using the captured image, the captured images being captured by a camera at different times; and a presentation unit changing a color of a region of the captured image into a color based on the calculated degree of change, the region showing the monitoring target.

(36) An image processing apparatus comprising:

a calculation unit calculating a degree of change in a state of a monitoring target in a plurality of captured images using the captured image, the captured images being captured by a camera at different times; and a presentation unit emphasizing a region of the captured image, the region showing the monitoring target.

This application claims priority from Japanese Patent Application No. 2014-134786, filed on Jun. 30, 2014, the entire contents of which are incorporated herein.

The invention claimed is:

1. An image monitoring system comprising at least one processor that is configured to execute instructions to perform:
   calculating an index value indicating a degree of change in a degree of insufficient monitoring, which is a degree that a monitoring target is not monitored by a security guard in a scene of a plurality of captured images, the captured images being captured at different times, the monitoring target including a person or a place, and the degree of insufficient monitoring being based on a distance between the monitoring target and the security guard near the monitoring target;
   presenting an indication based on the index value on a first captured image captured by a camera;
   calculating the degree of insufficient monitoring by a monotone non-decreasing function whose value becomes larger as the distance between the monitoring target and the security guard increases, wherein the value is determined by the distance and an absolute value of an angle of a gap between an orientation of the security guard and a direction to a location of the monitoring target.

2. The image monitoring system according to claim 1, wherein the at least one processor is further configured to execute the instructions to calculate the degree of insufficient monitoring based on a degree of focusing on guarding.

3. The image monitoring system according to claim 2, wherein the at least one processor is further configured to execute the instructions to:
   analyze the state or posture of the security guard based on at least one of the plurality of captured images; and
   determine the degree of focusing on guarding based on an analysis result of the state or posture of the security guard.

4. The image monitoring system according to claim 3, wherein the at least one processor is further configured to execute the instruction to determine that the degree of focusing on guarding is low when the analysis result indicates that the security guard takes a specific operation other than guarding, the specific operation including at least one of an operation of dealing with a customer, an operation of using a mobile phone, and an operation of installing a pole.

5. An image monitoring method executed by a computer comprising:
   calculating an index value indicating a degree of change in a degree of insufficient monitoring, which is a degree that a monitoring target is not monitored by a security guard in a scene of a plurality of captured images, the captured images being captured at different times, the monitoring target including a person or a place, and the degree of insufficient monitoring being based on a distance between the monitoring target and the security guard near the monitoring target;
   presenting an indication based on the index value on a first captured image captured by a camera,
   calculating the degree of insufficient monitoring by a monotone non-decreasing function whose value becomes larger as the distance between the monitoring target and the security guard increases, wherein the value is determined by the distance and an absolute value of an angle of a gap between an orientation of the security guard and a direction to a location of the monitoring target.

6. The image monitoring method according to claim 5, further comprising calculating the degree of insufficient monitoring based on a degree of focusing on guarding.

7. The image monitoring method according to claim 6, further comprising:
   analyzing the state or posture of the security guard based on at least one of the plurality of captured images; and
   determining the degree of focusing on guarding based on an analysis result of the state or posture of the security guard.

8. The image monitoring method according to claim 7, further comprising determining that the degree of focusing on guarding is low when the analysis result indicates that the security guard takes a specific operation other than guarding, the specific operation including at least one of an operation of dealing with a customer, an operation of using a mobile phone, and an operation of installing a pole.

9. A non-transitory computer readable medium storing a program for causing a computer to execute an image monitoring method, the method comprising:
   calculating an index value indicating a degree of change in a degree of insufficient monitoring, which is a degree that a monitoring target is not monitored by a security guard in a scene of plurality of captured images, the captured images being captured at different times, the monitoring target including a person or a place, and the degree of insufficient monitoring being based on a distance between the monitoring target and the security guard near the monitoring target;
   presenting an indication based on the index value on a first captured image captured by a camera,
   calculating the degree of insufficient monitoring by a monotone non-decreasing function whose value becomes larger as the distance between the monitoring target and the security guard increases, wherein the value is determined by the distance and an absolute value of an angle of a gap between an orientation of the security guard and a direction to a location of the monitoring target.

10. The non-transitory computer readable medium according to claim 9, wherein the method further comprises calculating the degree of insufficient monitoring based on a degree of focusing on guarding.

11. The non-transitory computer readable medium according to claim 10, wherein the method further comprises:
    analyzing the state or posture of the security guard based on at least one of the plurality of captured images; and
    determining the degree of focusing on guarding based on an analysis result of the state or posture of the security guard.

12. The non-transitory computer readable medium according to claim 11, wherein the method further comprises determining that the degree of focusing on guarding is low when the analysis result indicates that the security guard takes a specific operation other than guarding, the specific operation including at least one of an operation of dealing with a customer, an operation of using a mobile phone, and an operation of installing a pole.

13. The image monitoring system according to claim 1, wherein the degree of insufficient monitoring becomes higher as the distance between the monitoring target and the security guard becomes larger, and the degree of insufficient monitoring becomes lower as the distance becomes smaller.

14. The image monitoring method according to claim 5, wherein the degree of insufficient monitoring becomes higher as the distance between the monitoring target and the security guard becomes larger, and the degree of insufficient monitoring becomes lower as the distance becomes smaller.

15. The non-transitory computer readable medium according to claim 9, wherein the degree of insufficient monitoring becomes higher as the distance between the monitoring target and the security guard becomes larger, and the degree of insufficient monitoring becomes lower as the distance becomes smaller.

\* \* \* \* \*